Sept. 8, 1970 F. W. ZURCHER, JR 3,528,061
INTERLOCK ARRANGEMENT
Filed July 5, 1968 15 Sheets-Sheet 1
FIG. 1
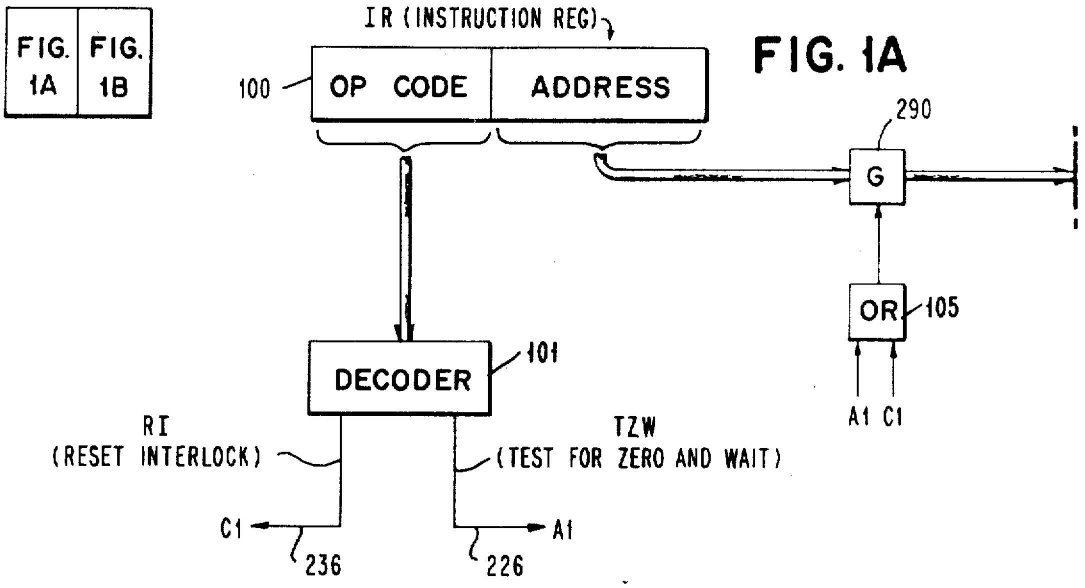
FIG. 1A
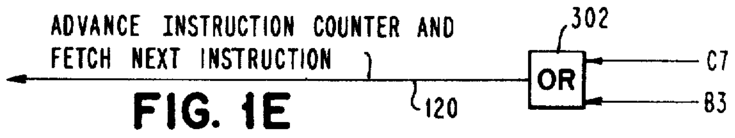
FIG. 1E
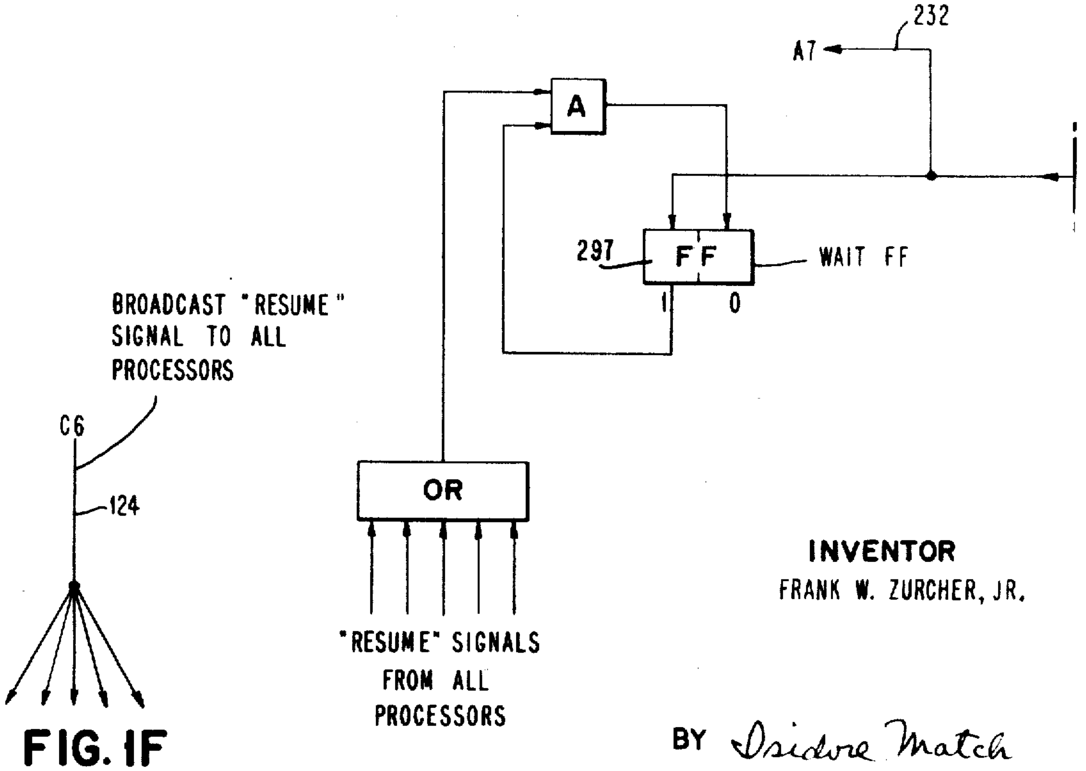
FIG. 1F
INVENTOR
FRANK W. ZURCHER, JR.
BY Isidore Match
ATTORNEY

INTERLOCK ARRANGEMENT

Filed July 5, 1968 15 Sheets-Sheet 2

Sept. 8, 1970 F. W. ZURCHER, JR 3,528,061

INTERLOCK ARRANGEMENT

Filed July 5, 1968 15 Sheets-Sheet 4

Sept. 8, 1970 F. W. ZURCHER, JR 3,528,061

INTERLOCK ARRANGEMENT

Filed July 5, 1968 15 Sheets-Sheet 8

Sept. 8, 1970 F. W. ZURCHER, JR 3,528,061

INTERLOCK ARRANGEMENT

Filed July 5, 1968 15 Sheets-Sheet 9

Sept. 8, 1970 F. W. ZURCHER, JR 3,528,061

INTERLOCK ARRANGEMENT

Filed July 5, 1968 15 Sheets-Sheet 13

Sept. 8, 1970 F. W. ZURCHER, JR 3,528,061

INTERLOCK ARRANGEMENT

Filed July 5, 1968 15 Sheets-Sheet 14

Sept. 8, 1970 F. W. ZURCHER, JR 3,528,061

INTERLOCK ARRANGEMENT

Filed July 5, 1968 15 Sheets-Sheet 15

United States Patent Office 3,528,061
Patented Sept. 8, 1970

3,528,061

INTERLOCK ARRANGEMENT

Frank W. Zurcher, Jr., Yorktown Heights, N.Y., assignor to International Business Machines Corporation, Armonk, N.Y., a corporation of New York Filed July 5, 1968, Ser. No. 742,669
Int. Cl. G06f 9/18
U.S. Cl. 340—172.5 5 Claims

ABSTRACT OF THE DISCLOSURE

A pair of complementary machine instructions, viz. a "test for zero and wait" (TZW) instruction and a "reset interlock" (RI) instruction, are utilized to prevent more than a first active entity in a data processing system from concurrently using a second entity. Upon the encountering of the first instruction, a location in shared memory, specified to contain the interlock information, is tested for current use or current availability for use of the aforesaid latter entity. If such entity is currently in use, other processors or entities in the system attempting to use the second entity are respectively placed in "wait" states until the processor or entity using this second entity encounters the second instruction. At this junction, the location is made to indicate that the second entity is available for use and a chosen one of the processors or entities at that time in the "wait" state is selected as eligible to next use the second entity and to take it out of the "wait" state.

CROSS-REFERENCE TO RELATED APPLICATION

Copending application of Meir M. Lehman, Jack L. Rosenfeld and Hans P. Schlaeppi for "Interlock Arrangement," Ser. No. 742,676, filed July 5, 1968, assigned to the present assignee.

BACKGROUND OF THE INVENTION

This invention relates to techniques for effecting interlocks in data processing systems. More particularly, it relates to an improved arrangement for interlocking program strings in a multiprocessor system.

A basic necessity in the operation of multiprocessor systems is the ensuring that individual processors in the system do not detrimentally interfere with one another. Thus, where a conflict arises due to a concurrent request for memory access to the same memory module or for the use of the same input-output equipment, it is necessary that all but one of the processors be made to wait until the requested access or use is made available to each of them in turn. Arrangements for ensuring such waiting are well known.

However, a situation may arise in which errors may be introduced because of the concurrent entering of two or more processors in a multiprocessing system into interrelated program strings which are sensitive to interference over spans which are longer than a single instruction. In this situation, the automatic lockout arrangement mentioned hereinabove which is built into the system hardware is not capable of effecting lockout and, consequently, it has been heretofore necessary to provide program-controlled interlocking techniques for such a contingency, these techniques enabling the programmer to indicate the extent of the program strings over which there is sensitivity to interference.

A typical example of interference, as set forth above, occurs when two processors are concurrently executing a segment of the supervisory program that allocates memory storage, such that this interference results in the same memory block being assigned to both of them. Thus, a convenient technique is required to prevent a second processor from entering into a critical section of a supervisory program into which a first processor has already entered.

Another example of interference could be one wherein several processors sharing the work involved in the execution of a certain job are adding quantities to a single sum element which involves the sequence of fetching the sum from memory, incrementing it, and moving it back into memory. In this situation, if one of these processors fetches the sum element in an attempt to increment it, while another processor is still engaged in modifying this same element, the result will be that the second processor fetches the sum element before it is updated, thereby losing the increment contributed by the first. The interlock must, consequently, permit only one processor to modify the sum at any given time.

Generally stated, the function of an interlock mechanism is to serialize the ownership of an entity, such as program strings, tables or lists, devices, etc., by a set of users of these entities, such a processes executed by procesing unit, input-output channels, and the like. The interlock function is effected in those situations where lack of serialization could cause errors due to ambiguity and other reasons.

An interlock mechanism has to be capable of effecting the following results:

(1) The prevention by one user of other users from using the entity (lock operation) and the thereafter permitting of other users to use the entity (unlock operation);

(2) The enabling of concurrent existence in the system of as many interlock conditions as are required; and (3) The prevention of a malfunction in the interlock mechanism's being caused by a critical timing of events.

In addition, it is desirable for the interlock mechanism to also be capable of effecting the following results:

(1) The prevention of interference by users waiting for an entity with active users (those users not waiting);

(2) The activating of only one selected user from a group of several users waiting for an entity when the entity is unlocked; and (3) The specifying of a time limit in order that a waiting user is directed to a specified function if the specified time limit is exceeded in the waiting for the entity to be unlocked.

Many techniques are known, at present, for implementing interlocks. These techniques involve considerable processing overhead and are, consequently, economically feasible only for handling interlocks which protect large sections of computations. Where interlocks are employed to synchronize sets of closely related tasks which respectively comprise large numbers of small blocks of coding to be interlocked individually, it becomes important to minimize the overhead which is associated with the interlock methods which are used. For example, a typical case in this regard is a large job which is subdivided into parallel tasks which can be respectively executed concurrently by several processors in order to reduce the turnaround time of the jobs. The known interlock techniques generally involve the useless consumption of large numbers of storage cycles by the waiting processors with the consequent excessive delay and interference experienced by the active processors.

An essential component of all presently known interlock arrangements is a Test-and-Set (TS) type mechanism which operates on the contents X of a location N in the main storage which is accessible to all of the processors. The general function of the TS instruction is as follows:

If $X=0$, then X is set to 1.

If $X \neq 0$, then X is changed but a branch condition latch is set (or a branch is executed).

A necessary element in the TS mechanism is the incorporation therein of means for preventing any other access to the aforementioned storage location N from occurring between the testing and the setting.

The following are examples of three known techniques for achieving interlocking, each of these methods fundamentally being dependent upon the TS mechanism:

(1) Dynamic dwells.—A first processor about to enter a given sensitive program section executes instructions that test whether another processor is already in that section. If no other processor is in that section, a lockout indicator is set and the first processor enters the given section. However, if another processor is already in that given section, the processor branches back to the test. This loop continues to be executed until the lock is unlocked by the processor in the sensitive program section. It is readily appreciated that the execution of such dwell while a processor is waiting because of an interlock constitutes a heavy and undesirable load on a shared memory.

(2) Enqueueing of waiting task.—In this technique, the interlocking instruction sequence precedes the sensitive program section. If it finds that section already occupied, the task the processor is executing is placed back onto the task queue and marked as being in the "wait" state. The fact that the task is waiting for a chosen event, which is in this situation is the action of leaving the sensitive section by the processor executing that section of coding, is recorded in the representation of such chosen event. The recording may, for example, be the inserting of a pointer to the representation of the waiting task. Thereafter, the waiting task is relinquished by its processor and the latter is then free to begin execution of another task from the queue of tasks ready to be executed.

When the event occurs for which the task is waiting, the latter task is marked as not being in the "wait" state any longer, whereby it becomes eligible for execution by an available processor.

Clearly, the "enqueueing of waiting task" technique is characterized by appreciable overhead which is incurred in the creating of information about a task in the "wait" state and the storing and reloading of the system registers upon every task exchange. If "wait/resume" pairs are employed for routine task synchronization involving short, but frequent, waiting intervals within long tasks, the purpose of using multiprocessing is likely to be defeated by the overhead.

(3) Programmed "wait" on processors.—To avoid the overhead inherent in task dumping, the interlocking sequence can be programmed to place the processor attempting to enter an occupied sensitive section of a shared memory into the "wait" state. This will cause the processor to idle while it is waiting, whereby it does not needlessly consume memory cycles. In order for the waiting processor to resume operation when the event occurs, it must leave information which identifies the event for which it is waiting prior to its entering into the "wait" state. This can be accomplished, for example, by entering the processor number into a list linked to the interlocked location N. Although the "programmed 'wait' on processors" technique is superior to the "dynamic dwells" and "enqueueing of waiting tasks" techniques, it, also, involves too much testing and list-processing to be acceptable for routine task synchronization. Also, it is wasteful in that it idles a processor that could be doing productive work.

From the foregoing, it is readily seen that presently known interlocks all impose a heavy and undesirable load on the shared memory and introduce disadvantageously extensive overheads.

Accordingly, it is an important object of this invention to provide an improved arrangement for interlocking program strings in a multiprocessing system.

It is another object to provide an arrangement in accordance with the preceding object in which the overhead is substantially minimized as compared to known arrangements serving the same purpose.

It is a further object to provide an arrangement in accordance with the preceding objects whereby interlocking requires only the fetching and executing of a single lock/unlock instruction pair per interlock action involved.

It is a still further object to provide an arrangement in accordance with the preceding objects wherein there is substantially eliminated the overhead which is incurred in the repeated testing of a memory location, in queuing, and in list manipulation.

It is another object to provide an arrangement in accordance with the preceding objects wherein active entities or processors in a multiprocessing system attempting to enter a section of a program which is currently being used by one of the entities or processors to place the other entities or processors into a "wait" state until the current user has terminated its use of the section.

It is yet a further object to provide an arrangement in accordance with the preceding objects wherein upon the termination of the use of a section by a current user a chosen one of the processors or entities waiting to use the aforesaid section is selected as eligible to next enter such section.

SUMMARY OF THE INVENTION

Generally speaking and in accordance with the invention, there is provided in a data processing system which includes a plurality of first active entities that may use the same second entities, an arrangement for preventing more than one of such entities from concurrently using the same second entity and for selecting the next eligible first entity for using the second entity upon the termination of the second entity's use by the first entity currently using it.

The arrangement comprises storage means shared by the first entities and having a specified location in which each of the first entities is represented and which indicates whether one of the first entities is currently using the second entity, which of the first entities is currently using the second entity and which of the first entities are waiting to use the second entity. Each of the first entities comprises means for receiving first and second instructions for respectively testing whether the second entity is currently being used by one of the first entities and for indicating that a first entity currently using the second entity has terminated its use. There are further included in each of the first entities means responsive to the encountering of the first instruction for determining whether the second entity is currently being used by one of the first entities and means responsive to the determination by the determining means that the second entity is in current use for causing any other first entities attempting to use the second entity during such use to be placed in a "wait" state relative to the second entity and for causing the location in the storage means to indicate the current using first entity and the first entities in the wait state. Means are included in each of the first entities operative upon a determination of the determining means that the second entity is free for use, for causing the storing in the storage means of the indication that the second entity is in use to thereby lock out all of the first entities other than the first entity currently attempting to use the second entity from using the second entity and for causing the location to indicate such use. In addition, means are included, responsive to the encountering by the first entity using the second entity, of the second instruction for causing the removal of such use indication from the location in the storage means and for effecting the selection of a chosen one of the first entities in the wait state as the next first entity eligible to use the second entity.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIGS. 1A and 1B, taken together as in FIG. 1, depict an illustrative embodiment, constructed in accordance with the principles of the invention, of the essential inventive concept;

FIG. 1C is a diagram of suitable circuitry for carrying out a step in the operation of the embodiment shown in FIGS. 1, 1A and 1B;

FIG. 1D is a depiction of suitable circuitry for carrying out another step in the operation of the embodiment shown in FIGS. 1, 1A and 1B;

FIG. 1E is a depiction of an arrangement also suitably used in the operation of the embodiment shown in FIGS. 1, 1A and 1B;

FIG. 1F shows the mechanism for broadcasting the "resume" signal;

DESCRIPTION OF PREFERRED EMBODIMENTS

The invention described hereinbelow essentially constitutes a relatively simple addition to conventional central processor hardware, whereby interlocking can be rendered substantially free of overhead. It requires only the fetching and executing of a single lock/unlock instruction pair for each interlock action. As will be shown, the inventive concept can be implemented in several embodiments which differ operationally and in the number of memory cycles their operations require. However, they are all based upon the following elements:

(1) A location specified as containing the interlock information in a memory accessible to a plurality of processors.

(2) A special memory cycle for testing and setting an interlock such that interference during that cycle is precluded.

(3) A "wait" state is which a processor preserves the state of a task without consuming memory cycles, and into which it automatically enters into upon the ascertaining of a locked interlock.

(4) Communicating connections available to each processor by which a processor can cause some or all of the waiting processors to resume operation, i.e., leave their respective "wait" states.

The foregoing elements are availed of by two complementary machine instructions, viz. a "Test for Zero and Wait" (TZW) instruction and a "Reset Interlock" (RI) instruction.

As will be shown hereinbelow, the TZW/RI instruction pair substantially eliminates the memory access interference incurred in the repeated testing of a memory location and the overhead involved in queueing and in list manipulation. The circuitry shown is provided for each of the processors involved. The memory is shared.

Figures 1B, 1C, 1D:
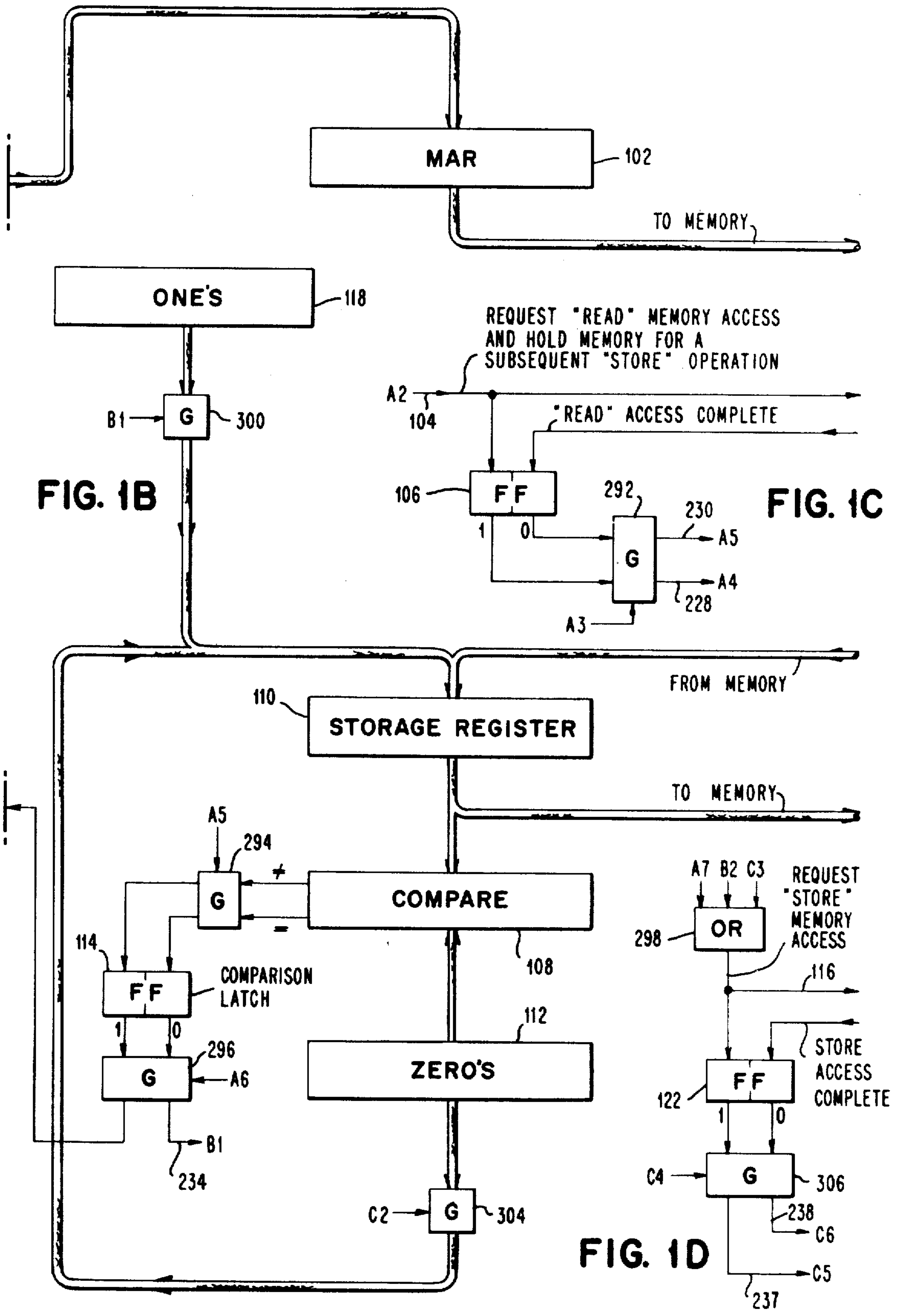
Figures 6, 7, 8, 9, 10, 11:
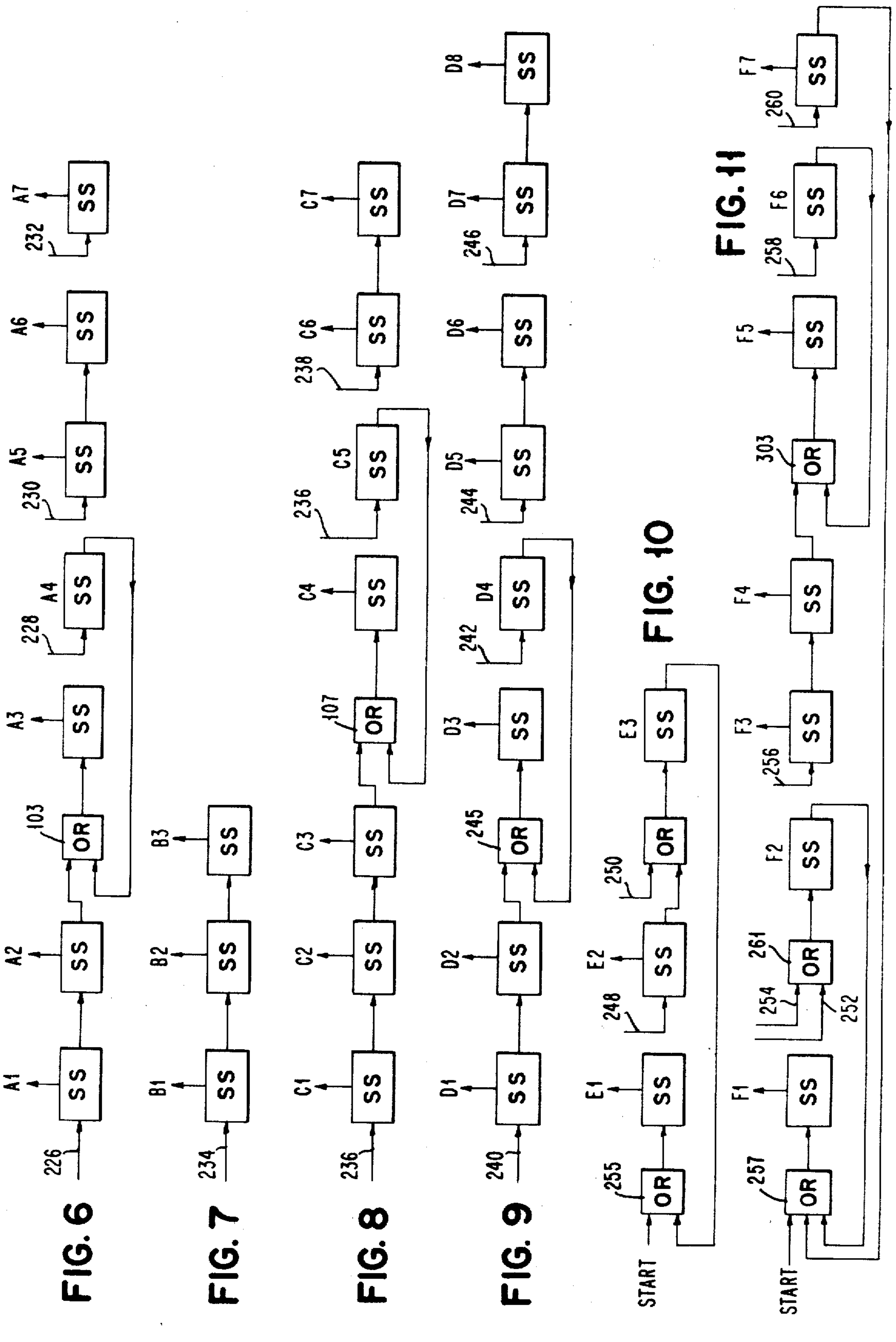
FIG. 6 is a diagram of the A clock which is employed to control a first microprogram which is carried out with the embodiment shown in FIGS. 1, 1A–1F.
FIG. 7 is a diagram of the B clock which is employed to control a second microprogram which is carried out with the embodiment shown in FIGS. 1, 1A–1F.
FIG. 8 is a diagram of the C clock which is employed to control a third microprogram which is carried out with the embodiment shown in FIGS. 1, 1A–1F.
FIG. 9 is a diagram of the D clock which is employed to control a first microprogram which is carried out with the embodiment shown in FIGS. 2, 2A–2F.
FIG. 10 is a diagram of the E clock which is employed to control a second microprogram which is carried out with the embodiment shown in FIGS. 2, 2A–2F.
FIG. 11 is a diagram of the F clock which is employed to control a third microprogram which is carried out with the embodiment shown in FIGS. 2, 2A–2F.

Reference is now made to FIGS. 1A and 1B, taken together as in FIG. 1, and FIGS. 1C–1F, which depict an illustrative embodiment of the essential concept of the invention, and FIGS. 6, 7 and 8 which show embodiments of clocks for controlling respective microprograms carried out in the operation of this embodiment.

The A, B and C clocks shown in FIGS. 6, 7 and 8 respectively, suitably comprise chains of monostable multivibrator stages, each of such stages being legended SS. The monostable multivibrators are arranged such that upon the reversion of a multivibrator from its quasi-stable to its stable state, it switches the multivibrator to which its output is applied to the quasi-stable state from which it returns automatically to its stable state after the lapse of a time interval determined by its design. The action of switching a monostable multivibrator to its quasi-stable state will henceforth be denoted as "triggering" or "actuating." In the ensuing description, for convenience of exposition, the output waveform delivered during the quasi-stable state of a monostable multivibrator is designated with the same notation as the multivibrator itself. Thus, for example, the output pulse of monostable multivibrator A1 in the A clock is referred to as pulse A1.

Referring back to FIG. 1 and FIGS. 1A–1F, it is seen therein that when a TZW instruction is encountered, a pulse is produced from decoder 101 (FIG. 1A) on line 226 which is applied to monostable multivibrator A1 (FIG. 6) to initiate the operation of the A clock. The pulse A1 output from multivibrator A1 is applied to a gate 290 through an OR circuit 105 in order to gate the address field of the instruction register (IR) 100 to the memory address register (MAR) 102. On the termination of pulse A1, monostable multivibrator A2 is triggered, its pulse output A2 being applied to a line 104 (FIG. 1C) to request a "read" memory access and to hold the shared memory (not shown) for a subsequent store operation. Concurrently, a flip-flop 106 is set to its "1" state. Upon the termination of pulse A2, which is passed through an OR circuit 103, monostable multivibrator A3 is triggered, its pulse A3 being applied to a gate 292 (FIG. 1C) in order to test for the state of flip-flop 106. If at the time of such testing, flip-flop 106 is in its "1" state, an output is present on line 228 which functions to trigger monostable multivibrator A4. The resulting phase A4 is employed for delay only and upon its termination, monostable multivibrator A3 is triggered through OR circuit 103. If, at the time that flip-flop 106 is tested by pulse A3, flip-flop 106 is in its "0" state, then an output is present on line 230 in the output of gate 292 and monostable multivibrator A5 is triggered. In this connection, it is to be noted that flip-flop 106 is rest to its "0" state when the "read" access is complete and the information from memory has been placed in a storage register 110 (FIG. 1B). In the embodiment of the invention, a configuration of all "0's," for example, is chosen to indicate that no processor is, at a given moment, using a particular section of a program (unlocked interlock) and a configuration of all "1's" is chosen to indicate that another processor is using the particular section (locked interlock).

At this point, i.e., with the "read" access completed, it is now necessary to test whether the contents of storage register 110 are all "0's" or are not all "0's." If such contents are all "0's," this condition signifies that a processor seeking to enter a particular section of a program can enter such section since no locked interlock exists. If the contents of register 110 are not all "0's," it means that a processor seeking entry must wait until the section of the memory containing the interlock information is unlocked by the processor using the particular section of the program, such unlocking being signified by the placing of all "0's" in the storage location.

Pulse A5 is applied to a gate 294 (FIG. 1B) in order to test the output of a compare unit 108. The compare unit 108 compares the contents of storage register 110 and that of a register 112 which always contains all "0's." Thus, if the contents of storage register 110 are all "0's," a comparison latch 114 is set to its "0" state. If, however, the contents of storage register 110 are not all "0's," comparison latch 114 is set to its "1" state.

At this juncture, when pulse A5 terminates, monostable multivibrator A6 is triggered. The resulting pulse A6 is applied to a gate 296 (FIG. 1B) in order to test the state of comparison latch 114. If latch 114 is in its "0" state, then an output appears on line 234 from gate 296 triggering monostable multivibrator B1 of the B clock (FIG. 7) whereby the operation of the B clock is initiated. As will be further understood, the microprogram controlled by the A clock carries out the TZW instruction. The microprogram controlled by the B clock effects the availing of a section of a program by a processor to the exclusion of the other processors when such section is not protected by an interlock. Such situation exists when comparison latch 114 is in its "0" state.

However, if, upon being tested, comparison latch 114 is in its "1" state, a wait flip-flop 297 (FIG. 1C) is switched to its "1" state and the output of gate 296 appearing on line 232 triggers monostable multivibrator A7 in the A clock. Pulse A7 is applied to OR circuit 298 (FIG. 1D) in order to request a "store" memory access. It is to be noted that pulse A7, in addition to causing a pulse to appear on the output line 116 from OR circuit 298, also sets a flip-flop 122 to its "1" state. Such setting of flip-flop 122 does not have any significance at this juncture since it is not necessary at this time to test for the completion of the "store" access. The "store" access is, of course, necessary to complete the memory operation. It is recalled that pulse A2 had been applied to line 104 to effect the holding of the memory for subsequent "store" operations, such necessary "store" operation being effected by the operation of pulse A7 as just described.

It is also recalled that when comparison latch 114 had been tested by pulse A6, if latch 114 had been in its "0" state at the time, an output from gate 296 would be present on line 234 and monostable multivibrator B1 would be triggered to initate the operation of the B clock. Pulse B1 is applied to a gate 300 (FIG. 1B) to gate "one's" from a "one's" register 118 to storage register 110. Upon the termination of pulse B1, monostable multivibrator B2 is triggered and its resulting pulse output B2 is applied to OR circuit 298 in order to request a "store" memory access. When pulse B2 terminates, monostable multivibrator B3 is triggered and its resulting output pulse B3 is applied to an OR circuit 301 (FIG. 1E) whereby an output appears on line 120, such output being a signal to advance the instruction counter and fetch the next instruction.

With this operation, the processor gaining entry into a particular section of a program gains control thereof while protected by the interlock; it stores the locking information in the form of all "1's" in the memory so as to lock out any other processor which might attempt to gain access to this section. The last instruction of an interlocked section is chosen to be a "reset interlock" (RI) instruction.

When the controlling processor completes its execution of an interlocked series of instructions, it executes the reset interlock" (RI) instruction. As shown in FIG. 1A, when an RI instruction is decoded, the output line 236 from decoder 101 is activated whereby the C clock (FIG. 8) is initiated into operation. The C clock is similar in structure to the A and B clocks but its operation controls the microprogram effecting the RI instruction.

Upon the initiation of operation of the C clock, the C1 pulse output from monostable multivibrator C1 is applied to gate 290 through OR circuit 105 to gate the address of the interlock location from instruction register 100 to memory address register (MAR) 102. Upon the termination of pulse C1, monostable multivibrator C2 is triggered and its resulting pulse C2 output is applied to gate 304 (FIG. 1B) to gate the "0's" from register 112 to storage register 110. Upon the termination of the C2 pulse, a monostable multivibrator C3 is actuated and its pulse C3 output is applied to OR circuit 298 (FIG. 1D) to activate line 116 and thereby request a "store" memory access while concurrently switching flip-flop 122 to its "1" state. It is to be noted that at this juncture, it is necessary to test for the completion of the "store" access. Accordingly, upon the termination of the C3 pulse and the consequent actuation of monostable multivibrator C4 through an OR circuit 107, pulse C4 is applied to gate 306 (FIG. 1D) to test flip-flop 122. If, at this time, flip-flop 122 is in its "1" state, monostable multivibrator C5 will be triggered. However, if flip-flop 122 is in its "0" state, then monostable multivibrator C6 is triggered. Pulse C5 is utilized for delay only and upon its termination monostable multivibrator C4 is again triggered through OR circuit 107. Pulse C6 is applied to line 124 (FIG. 1F) to broadcast the "resume" signal to all processors. Pulse B3 is applied to OR circuit 302 (FIG. 1E) to advance, by way of line 120, the instruction counter and fetch the next instruction. At this point, the interlock location in memory contains all "0's" and the interlock has been reset.

Accordingly, with the arrangement shown in FIGS. 1A–1F, there is effected the substantially overhead free interlocking with two complementary machine instructions, i.e., the test for zero and wait (TZW) and the reset interlock (RI).

Figure 1G:
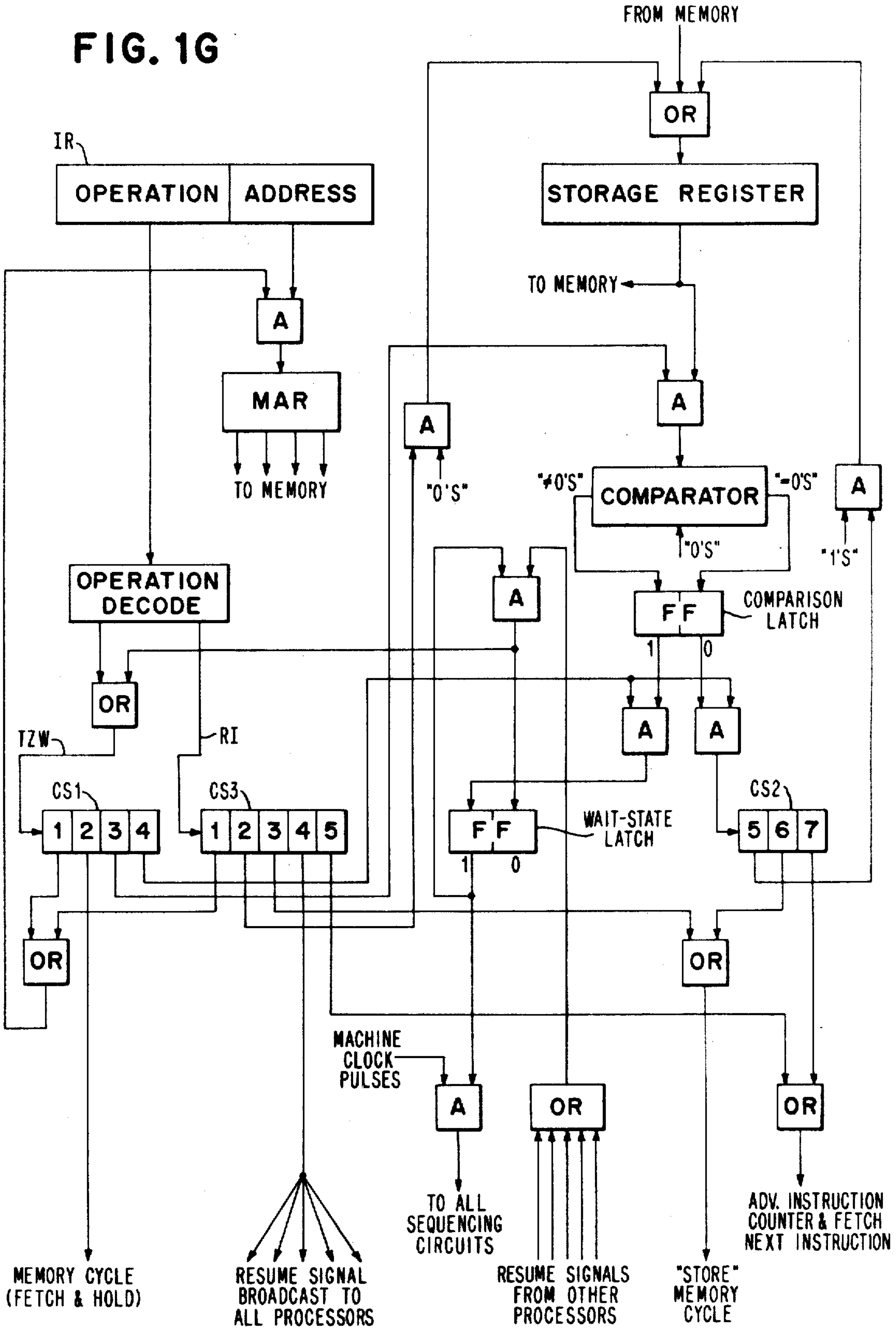
FIG. 1G is a depiction of a generalized embodiment of the essential inventive concept.

In FIG. 1G, wherein there is shown a generalized embodiment of the basic TZW/RI mechanism constructed in accordance with the principles of the invention, the control sequences implementing the TZW and RI instructions are represented by shift register CS1, CS2 and CS3. A single "1" bit is inserted on the left of a register upon the activation of a sequence. Every stage activates a step of the sequence and the propagation, as shown in FIG. 1G, is from left to right.

The decoding of a TZW instruction initiates control sequence CS1 which comprises the following steps.

(1) The sending of an address N from the instruction register IR to the memory address register MAR.

(2) The initiating of a fetch and hold cycle, or the equivalent to hold the bus connection to the selected storage module until the processor initiates a second memory cycle.

(3) The comparing of the memory contents just received with "0" and storing the result in a comparison latch.

(4) If $C(N) \neq 0$ (the comparison shows inequality), then the processor is put into the wait state thereby halting all of its sequencing circuits. The instruction counter is not advanced. If $C(N) = 0$ (the comparison shows equality), then the control sequence CS2 is initiated.

The control sequence CS2 locks the interlock and allows the processor to continue. The steps are:

(1) The setting of the storage register sign bit to "1."

(2) The initiating of a store memory cycle.

(3) The advancing of the instruction counter and proceeding to execute succeeding instructions.

The decoding of an RI instruction initiates control sequence CS3. This sequence comprises the following steps:

(1) The sending of address N from the instruction register IR to memory.

(2) The setting of all "0's" into the storage register.

(3) The initiating of a "store" cycle in memory.

The foregoing steps 1–3 open the interlock to other tasks.

(4) The broadcasting of a signal to all processors to resume processing.

(5) The advancing of the instruction counter.

Upon the receipt if a "resume" signal, a processor that is in the "wait" state will revert to the active state, thereby permitting normal sequencing to resume. The TZW instruction will once again be executed since the instruction counter and instruction register of the latter processor had not been altered by the TZW instruction that originally put the processor into the wait state.

Figures 2, 2A, 2C, 2D, 2F:
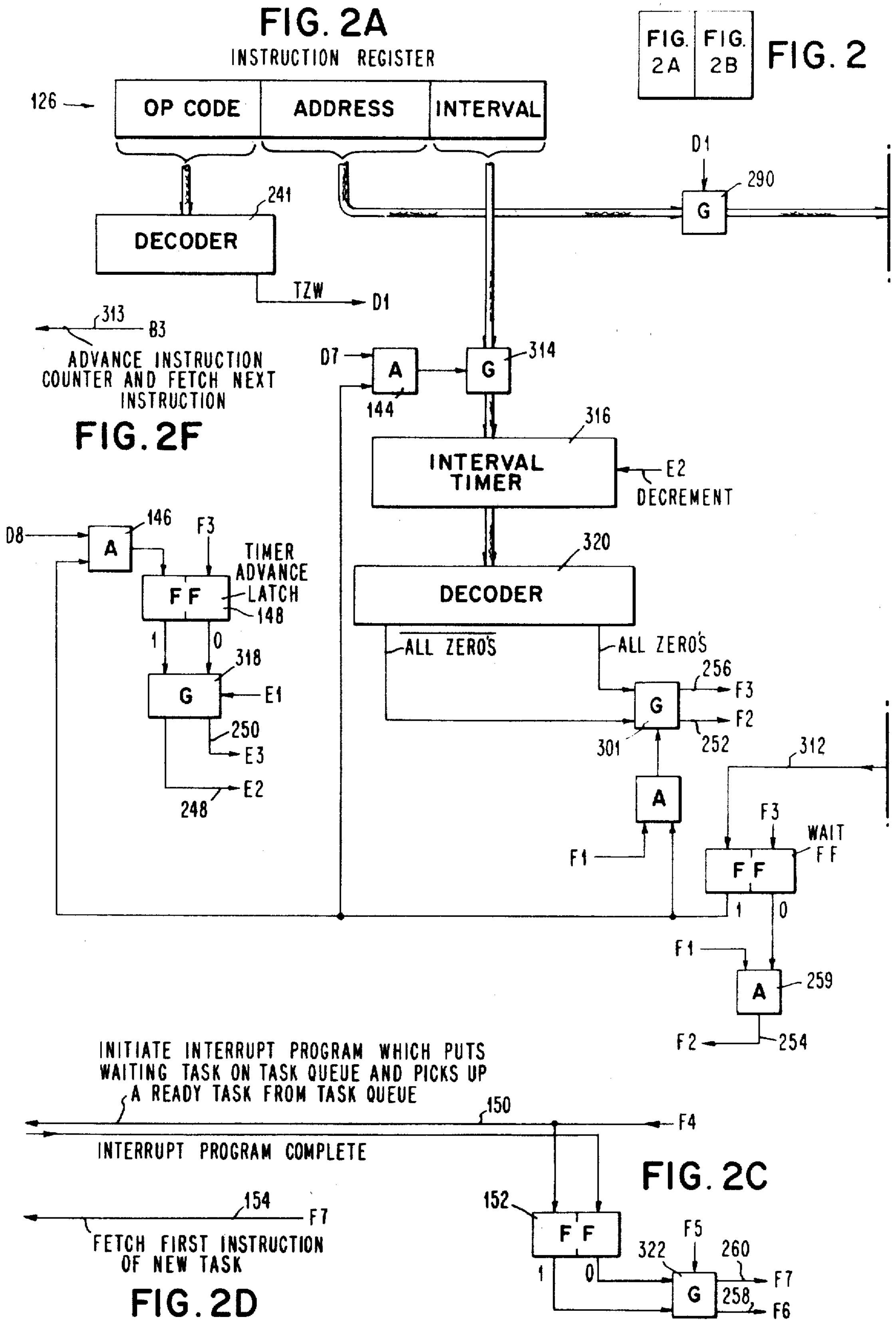
FIGS. 2A and 2B, taken together as in FIG. 2, depict another embodiment, constructed in accordance with the principles of the invention, this embodiment including a timed "wait" feature.
FIG. 2C is a diagram of suitable circuitry for carrying out a step in the operation of the embodiment shown in FIGS. 2, 2A and 2B.
FIG. 2D is a diagram for carrying out another step in the operation of the embodiment shown in FIGS. 2, 2A and 2B.
FIG. 2F shows the mechanism for advancing the instruction counter and the fetching of the next instruction.
Figures 2B, 2E:
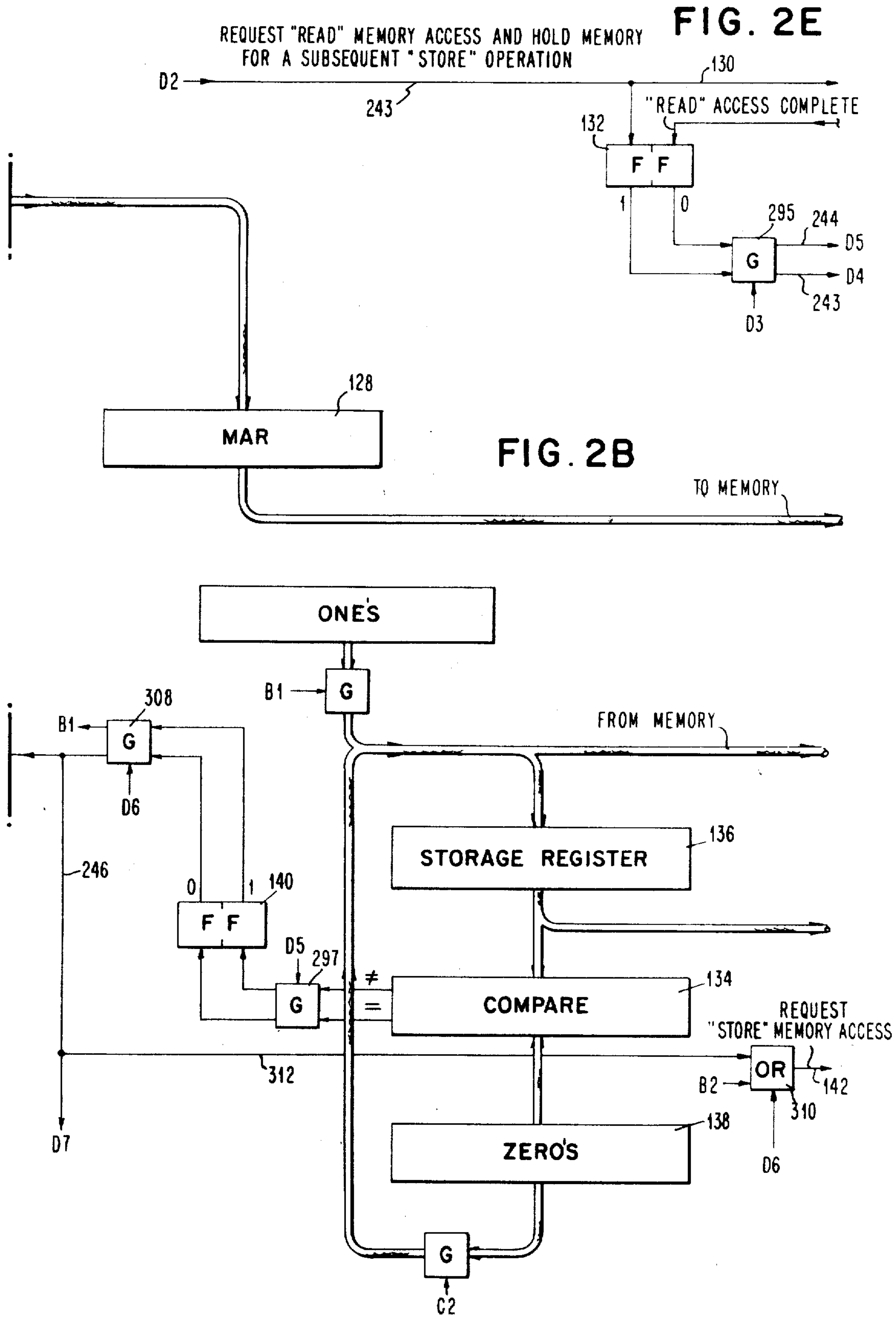
FIG. 2E is a depiction of an arrangement also suitably employed in the operation of the embodiment shown in FIGS. 2, 2A and 2B.

Reference is now made to FIGS. 2A and 2B, taken together as in FIG. 2, and FIGS. 2C–2E, and the D, E and F clocks shown in FIGS. 9, 10 and 11 respectively for the description of the structure and an explanation of the operation of another embodiment constructed in accordance with the principles of the invention. The D, E and F clocks are similar in structure and operation to the A, B and C clocks respectively.

The D clock, similar to the A clock, controls the microprogram for carrying out the TZW instruction. In addition, it effects the "interval" or timed wait operation.

In considering the operation of the D clock, it is initiated into operation when a TZW instruction is encountered whereby the output line 240 from decoder 241 is activated (FIG. 2A). Pulse D1 is applied to a gate 290 in order to gate the address from an instruction register 126 (FIG. 2A) to a memory address register (MAR) 128 (FIG. 2B). When pulse D1 terminates, monostable multivibrator D2 is actuated and its output pulse D2 is applied to a line 243 to request a "read" memory access and to hold the memory for subsequent store operation. Concurrently, a flip-flop 132 is switched to its "1" state (FIG. 2E). When pulse D2 terminates, monostable multivibrator D3 is actuated through an OR circuit 245, pulse D3 being applied to a gate 295 in order to test flip-flop 132. If flip-flop 132 is in its "1" state, then the output line 242 of gate 295 is actuated and monostable multivibrator D4 is triggered, pulse D4 being used for delay only and, upon its termination, monostable multivibrator D3 is again actuated through OR circuit 245. However, if at this time, flip-flop 132 is in its "0" state, then an output line 244 from gate 295 is activated whereby monostable multivibrator D5 is triggered. The latter event will occur when the "read" access is complete and the data word has been placed in storage register 136. It is recognized that the first five steps controlled by the D clock are the same as those controlled by the first five steps of the A clock.

At this point, it is desired to test whether the contents of storage register 136 are all "0's" or not all "0's." If the contents of storage register 136 are all "0's," this signifies that a processor can enter the section of a program being executed which is protected by this interlock. If the contents of storage register 136 are not all "0's," it signifies that the processor must wait until the program section is unlocked by some other processor's placing all "0's" into that storage location. Pulse D5 is applied to a gate 297 in order to test the output of a compare unit 134. In compare unit 134, there are compared the contents of storage register 136 with the all "0's" setting contained in a register 138.

If, at this point, the contents of storage register 136 are all "0's," then a comparison latch, i.e., a flip-flop 140 (FIG. 1B), is reset to its "0" state. However, if the contents of storage register 136 are not all "0's," then flip-flop 140 is set to its "1" state. Upon the termination of pulse D5, monostable multivibrator D6 is actuated. Pulse D6 is applied to a gate 308 (FIG. 2B). If, at this time, flip-flop 140 is in its "1" state, the "wait" flip-flop (FIG. 2A) is set to its "1" state, the pulse appearing on output line 312 of gate 308 also being applied to an OR circuit 310 to provide an output of line 142 to request a "store" memory access. When flip-flop 140 is in its "1" state, line 246 at the output of gate 308 is activated whereby monostable multivibrator D7 is actuated. Pulse D7 is applied to an AND circuit 144 (FIG. 2A). If the "wait" flip-flop is in its "1" state at the time that pulse D7 is applied to AND circuit 144, AND circuit 144 is enabled whereby the output therefrom is applied to a gate 314 to gate the "interval" field of instruction register 126 to the interval timer 316, the "interval" field containing time duration information. When pulse D7 terminates, monostable multivibrator D8 is triggered, its resulting pulse D8 output being applied to an AND circuit 146 (FIG. 1A). If the "wait" flip-flop is in its "1" state, AND circuit 146 is enabled whereby the output therefrom sets the timer advance flip-flop 148 to its "1" state.

The E clock determines that the specification of the duration of the interval is met. Thus, when flip-flop 148 is so set to its "1" state, the E clock (FIG. 10) is effective to count down interval timer 316. The operation of the E clock is initiated by a suitable start pulse (not shown) through an OR circuit 255, which actuates monostable multivibrator E1. Pulse E1 is applied to a gate 318 (FIG. 2A) to test for the state of flip-flop 148. If, at this time, flip-flop 148 is in its "1" state, then monostable multivibrator E2 is actuated by the pulse appearing on the output line 248 from gate 318. However, if flip-flop 148 is in its "0" state, then monostable multivibrator E3 is actuated by the pulse appearing on the output line 250 of gate 318 through an OR circuit. Pulse E3 is employed for delay only and upon its termination monostable multivibrator E1 is again actuated through OR circuit 255. Pulse E2 is applied to interval timer 316 to decrement it.

The F clock shown in FIG. 11 is utilized to test the output of interval timer 316 through a decoder 320. The operation of the F clock is initiated by a suitable start pulse (provided by means not shown) which passes through an OR circuit 257 to actuate a monostable multivibrator F1. Pulse F1 is applied to an AND circuit 259 (FIG. 2A) as is the reset output of the "wait" flip-flop. When the "wait" flip-flop is in its "0" state and pulse F1 is present, AND circuit 259 is enabled to provide an output on line 254, such output being passed through an OR circuit 261 to actuate a monostable multivibrator F2. It is seen in FIG. 2A that when stage 320 has a setting which is not all "0's," a gate 301 has an output on a line 252 and if the setting in decoder 320 is all "0's," then gate 301 has an output on line 256. When an output appears on line 252, it is also effective, through OR circuit 261, to actuate monostable multivibrator F2. It is thus seen that as long as interval timer 316 is not at all "0's," the F clock will oscillate between steps F1 and F2. However, when interval timer 316 has been counted down to zero, whereby an output pulse appears on line 256 from gate 301, then monostable multivibrator F3 is actuated. Pulse F3 is employed to reset flip-flop 148 (FIG. 2A), i.e., the timer advance latch, to its "0" state. Pulse F3 is also utilized to reset the "wait" flip-flop to its "0" state. Upon the termination of pulse F3, a monostable multivibrator F4 is actuated, pulse F4 being applied to a line 150 (FIG. 2C) to initiate an interrupt program which places the waiting task on a task queue and picks up a ready task from the task queue. The pulse on line 150 is also employed to set a flip-flop 152 to its "1" state. Upon the termination of pulse F4, a monostable multivibrator F5 is actuated through an OR circuit 303 (FIG. 11), pulse F5 being applied to a gate 322 to test flip-flop 152. If, at this juncture, flip-flop 152 is in its "1" state, then a pulse appears on the output line 258 of gate 322 and a monostable multivibrator F6 is actuated. If, however, flip-flop 152 is in its "0" state, then a pulse appears on the output line 260 of gate 322 and a monostable multivibrator F7 is triggered. Pulse F6 is employed for delay only and upon its termination monostable multivibrator F5 is reactuated through OR circuit 303. Pulse F7 is applied to a line 154 (FIG. 2D) in order to fetch the first instruction of the new task.

Upon the termination of pulse F7, monostable multivibrator F1 is reactuated through OR circuit 257 and the F clock thereby continues to test the contents of interval timer 316. Pulse B3 is applied to line 313 (FIG. 2F) to cause the advancing of the instruction counter and the fetching of the next instruction.

Figure 2G:
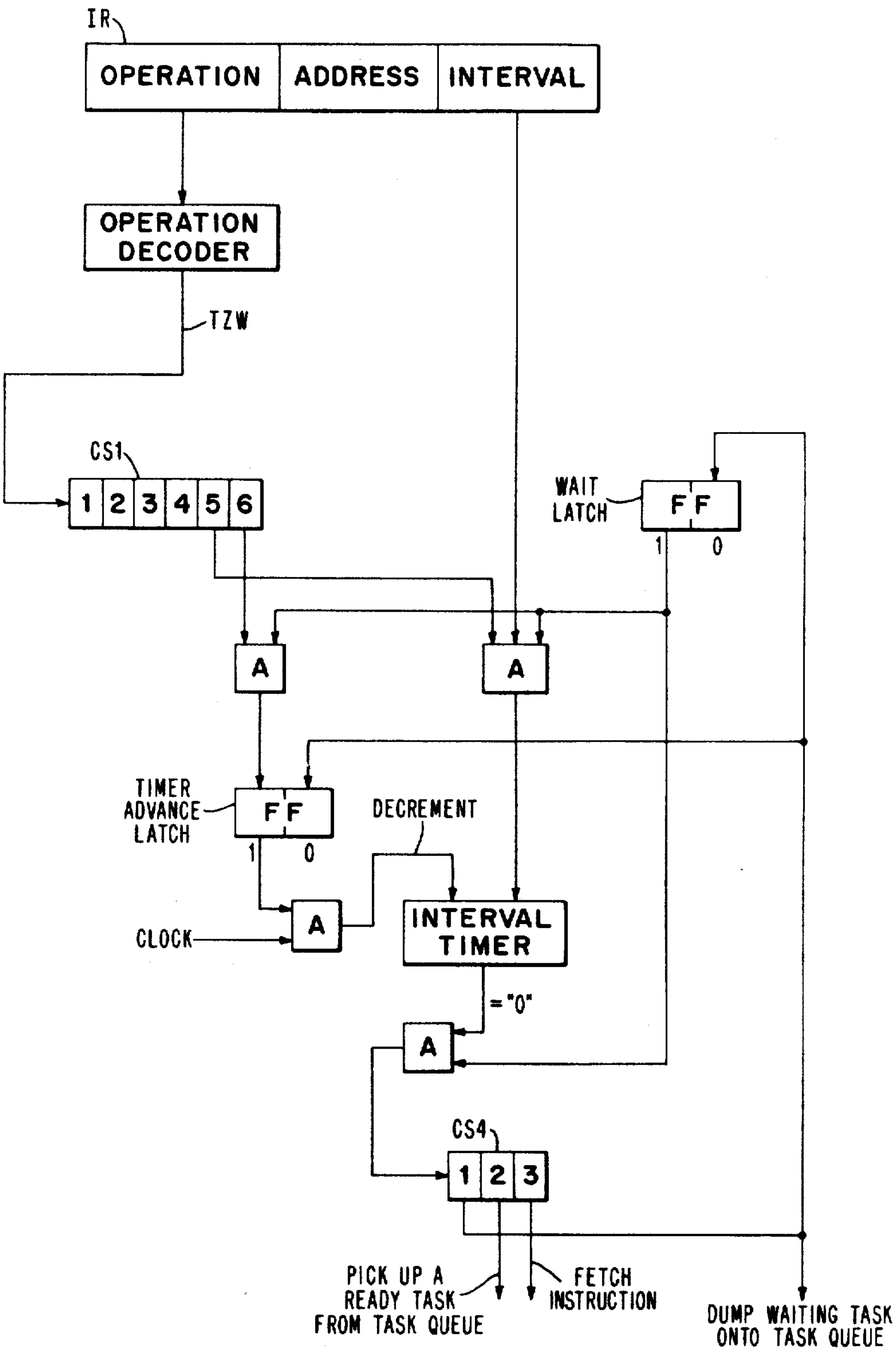
FIG. 2G is a depiction of a generalized embodiment of the invention and including the timed "wait" feature.

FIG. 2G is a depiction similar to FIG. 1G and is a depiction of a generalized embodiment of the inventive concept including the "timed wait" feature. The latter feature is based upon the alternative of supplying the interval specification in a special field of the TZW instruction. An interval specification of zero will permit the timer to go through the complete period which determines the upper limit of the interval.

As shown in FIG. 2G, the timed wait feature employs two additional sequencing steps as controlled by shift register CS1. On the fifth step, the interval specification is gated into the interval timer if the processor is in the "wait" state. At the sixth step, the advance pulse latch for the timer is set thereby allowing clock pulses to count it down. Upon reaching "zero", the timer initiate a control sequence controlled by shift register CS4 which comprises three steps, viz.:

(1) The dumping of the processor's registers' contents and other information about the waiting task onto the task queue and the resetting of the "wait" and "advance" latches.

(2) The loading of the processor's registers with the state of a new task from the task queue.

(3) The initiating of the instruction-fetch sequence (the instruction counter is loaded when the new task is picked up from the task queue). This third step effectively initiates the new task.

In considering the difference between the embodiment shown in FIGS. 1, 1A–1G and FIGS. 2, 2A–2G, in the former embodiment which is implementation of the essential concept of the invention, the decoding of a TZW instruction initiates the control sequence which comprises: the sending of the pertinent address from the instruction register to the memory address register, the initiation of a fetch and hold memory cycle, the comparing of the memory contents just received with "zero", and storing the comparison result in a latch. If the comparison does not show equality, then a processor is put into the "wait" state thereby stopping all of its sequencing circuits and the instruction counter is not advanced. If the comparison shows equality, then a control sequence is initiated in which a store memory cycle is initiated and the instruction counter is advanced whereby the execution of succeeding instructions proceeds.

The decoding of an RI instruction initiates the control sequence which comprises the steps of sending the pertinent address from the instruction register to memory, the setting of all "0's" into the storage register, the initiating of a "store" cycle in memory, the broadcasting of a signal to all processors to resume processing and the advancing of the instruction counter. Upon the receipt of a "resume" signal, a processor that is in the "wait" state, simply reverts to the active state thereby permitting normal sequencing to resume. The TZW instruction is once again executed since the instruction counter and the instruction register of the processor in question were not altered by the TZW instruction that originally put the processor into the "wait" state.

The essential concept results in the leaving of a waiting task on its processor until a resume signal is received. Such arrangement may not be tolerable in many system designs because a processor may be immobilized for an inefficiently long period. Accordingly, in the embodiments shown in FIGS. 2, 2A–2G, the timing mechanism is included in order to limit the time intervals during which a waiting task can maintain a processor in the idle state. By the action of this timing mechanism, when a given interval lapses, a processor automatically dumps the waiting task into a task queue and, in so doing, becomes available to execute some other task that may exist on the queue in a state of being ready for execution.

The timer may be set to a maximum latency interval, specified by a programmer, which is subject of course to a built-in upper limit. Such interval specification may be provided by either a field in the TZW instruction, as shown in the embodiment of FIGS. 2, 2A–2F, for example, or by the preparatory loading of a register whose address is implicitly or explicitly specified by the TZW instruction. Alternatively, the interval can be a fixed quantity. In the embodiment shown in FIGS. 2, 2A–2F, there is provided a special field, i.e., an "interval" field, in the TZW instruction.

As described in connection with the generalized embodiment shown in FIG. 2G, the interval specified in the TZW instruction is gated into an interval timer if the processor is in the "wait" state. Upon a given step, the timer advance latch is set permitting clock pulses to count the timer down. Upon the reaching of a "0" state, a control sequence is initiated which comprises the dumping of the processor register contents and other information about the waiting task onto the task queue and the resetting of the "wait" and timer advance latches, the loading of the processor registers with the state of a new task from the task queue, and the initiation of the instruction fetch sequence, i.e., the instruction counter is loaded when the new task is picked up from the task queue. The latter step effectively initiates the new task.

It is realized that it may be possible for a number of processors to be waiting with the same or different interlocks to be unlocked. If a plurality of processors are waiting at the instant that one of these interlocks is opened, the basic RI instruction execution arrangement will permit all of these processors to simultaneously resume, thereby sending the processors to seek access to their respective interlock locations. When several processors simultaneously attempt to access the same location in memory, one of them will obtain access first by virtue of the memory request resolution facilities that must be present in any system comprising shared memory units. It will find the interlock open and proceed into the protected section closing the interlock behind it. The other processors will eventually also gain access to the interlock location but they will find it closed and will have to revert to the "wait" state.

Clearly, the above mode of operation, although logically satisfactory, does waste memory cycles by tasks contending for the opening of one and the same interlock, thereby slowing down the working task. Such waste can be eliminated by permitting only those processors to resume that are waiting for a certain class of interlocks rather than for any interlock, which will be referred to as a "selective resume" procedure. A class of interlocks can be specified in many ways, based upon any program state quantity known to both the waiting and the resuming tasks. Examples of quantities, upon which the class specification can be based, are the address of the pertinent interlock location, the latter address modulo *r*, where *r* is less than the address range, an immediate quantity transmitted by both the TZW and the RI instructions, any word stored in the processor register memory or memory location whose address is known by implication or explicitly specified by the TZW and RI instructions, etc.

In FIGS. 3 and 3A–3F, there is shown an embodiment constructed in accordance with the principles of the invention which also includes a "selective resume" feature. The microprogram clocks utilized in the operation of the embodiment shown in these figures are the G and H clocks shown in FIGS. 12 and 13 respectively, the G and H clocks being similar in construction and operation to the A–F clocks.

Referring now to FIGS. 3, 3A–3F and FIGS. 12 and 13, it is recalled that when a processor completes the execution of a series of instructions which is protected by an interlock, the last instruction is the RI instruction.

Figures 12, 13, 14, 15, 16:
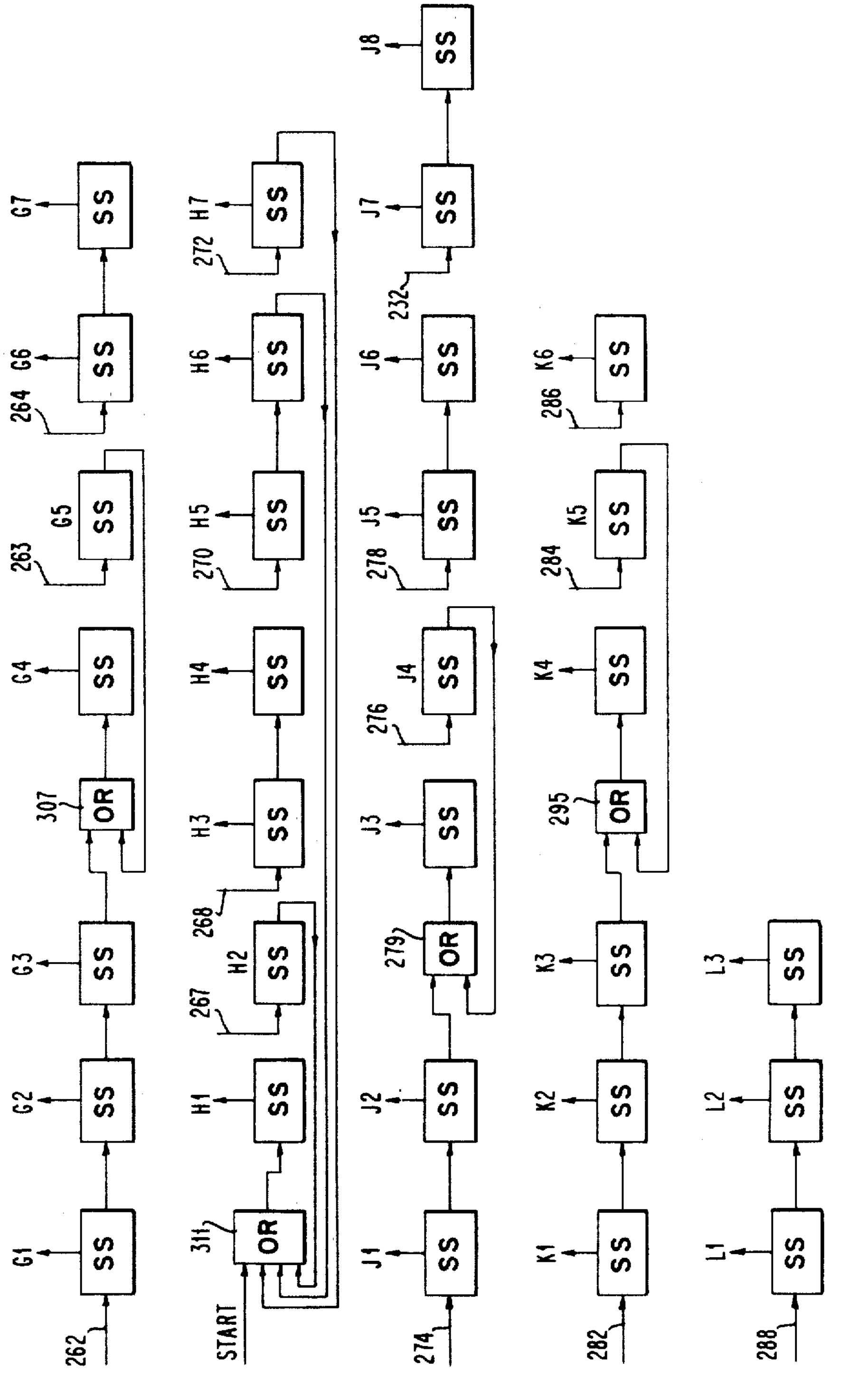
FIG. 12 is a diagram of the G clock which is employed to control a first microprogram carried out with the embodiment shown in FIGS. 3, 3A–3F.
FIG. 13 is a diagram of the H clock which is employed to control a second microprogram carried out with the embodiment shown in FIGS. 3, 3A–3F.
FIG. 14 is a diagram of the J clock which is employed to control a first microprogram carried out with the embodiment shown in FIGS. 4, 4A, 4B and FIGS. 5, 5A–5E.
FIG. 15 is a diagram of the K clock which is employed to control a second microprogram carried out with the embodiment shown in FIGS. 4, 4A, 4B and FIGS. 5, 5A–5E.
FIG. 16 is a diagram of the L clock which is employed to control a third microprogram carried out with the embodiment shown in FIGS. 4, 4A, 4B and FIGS. 5, 5A–5E.

Thus, when the RI instruction appears in the OP code field of an instruction register 156, thereby output line 262 of a decoder 157 is activated to trigger a monostable multivibrator G1 (FIG. 12). Pulse G1 is applied to a gate 159 in order to gate the address of the interlock from instruction register (IR) 156 to a memory address register (MAR) 158. Upon the termination of pulse G1, a monostable multivibrator G2 is activated and its resulting pulse, output pulse G2, is applied to a gate 305 to gate "0's" from a "0's" register 160 to a storage register 162. Upon the termination of pulse G2, a monostable multivibrator G3 is activated and its output pulse G3 is applied to a line 164 (FIG. 3D) to request a "store" memory access and also to set a flip-flop 166 to its "1" state. At this point, it is necessary to test for the completion of the "store" access. For this purpose, upon the termination of pulse G3 and the activation of a monostable multivibrator G4 through an OR circuit 307, pulse G4 is applied to a gate 309 to test flip-flop 166. If flip-flop 166 is in its "1" state, then an output line 263 of gate 309 is activated to trigger a monostable multivibrator G5. However, if at this time, flip-flop 166 (FIG. 3D) is in its "0" state, then the output line 264 from gate 309 is activated to trigger a monostable multivibrator G6. Pulse G5 is employed for delay only and upon the termination of pulse G5, monostable multivibrator G4 is again activated through OR circuit 307. It is noted that G1–G5 function in the same manner as C1–C5 in carrying out the RI instruction.

Figures 3, 3A, 3D, 3E, 3F:
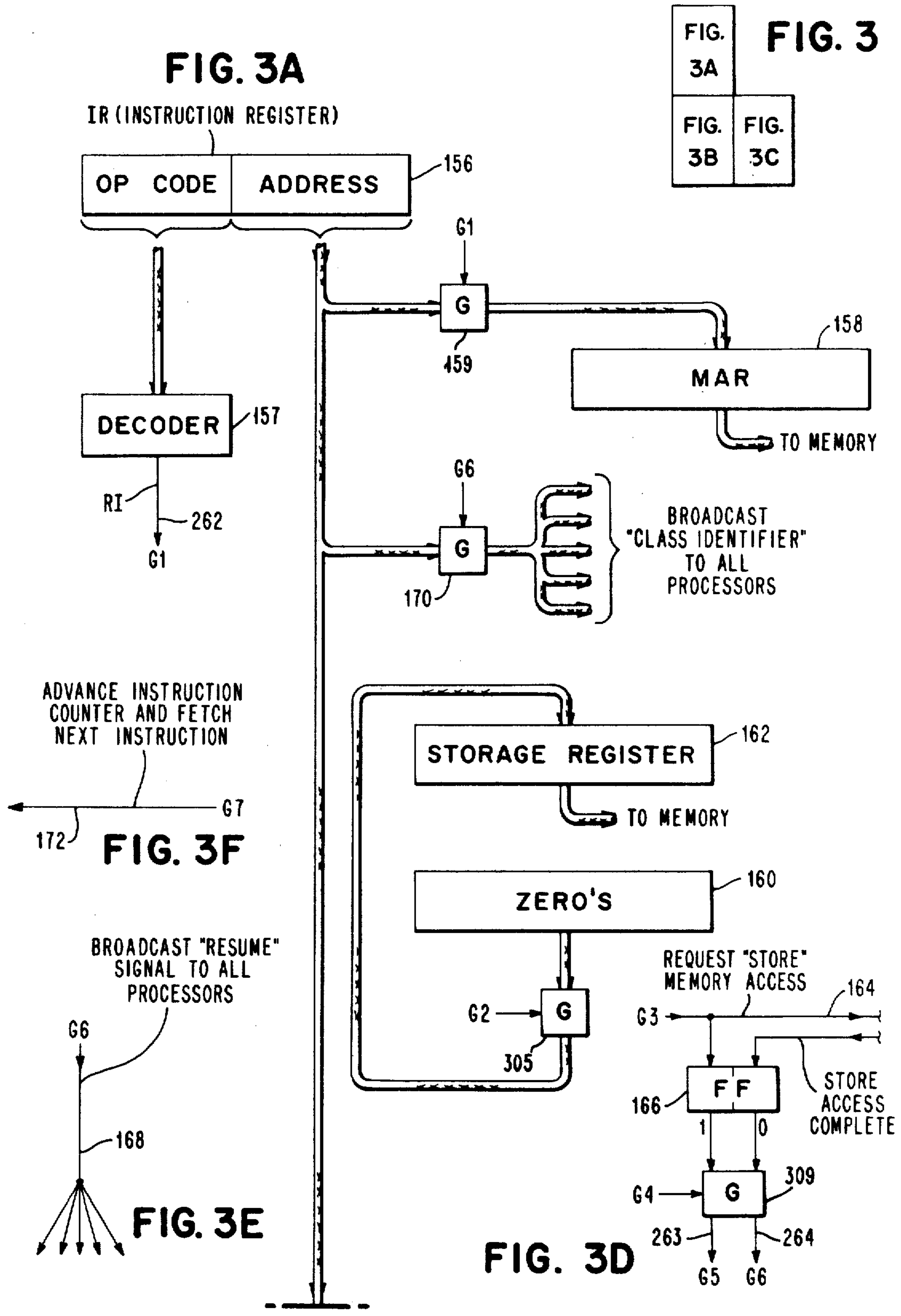
FIGS. 3A, 3B and 3C, taken together as in FIG. 3, depict another embodiment, constructed according to the invention, and illustrating the selected "resume" feature.
FIG. 3D shows an arrangement for carrying out a step in the operation of the embodiment shown in FIGS. 3, 3A–3C.
FIG. 3E shows the arrangement for broadcasting the "resume" signal in the operation of the embodiment shown in FIGS. 3, 3A–3C.
FIG. 3F shows the arrangement for effecting the advancing of the instruction counter and the fetching of the next instruction in the operation of the embodiment shown in FIGS. 3, 3A–3C.

Pulse G6 is applied to line 168 which broadcasts the "resume" signal to all of the processors (FIG. 3E). Pulse G6 is also applied to gate 170 to broadcast a "class identifier" signal to all processors (FIG. 3A). Note that the right-hand field of instruction register 156 contains the address part of the instruction, which is here assumed to serve as "class identifier" information. Upon the termination of pulse G6, a monostable multivibrator G7 is activated, pulse G7 therefrom being applied to a line 172 (FIG. 3F) in order to advance the instruction counter and fetch the next instruction.

Figure 3B:
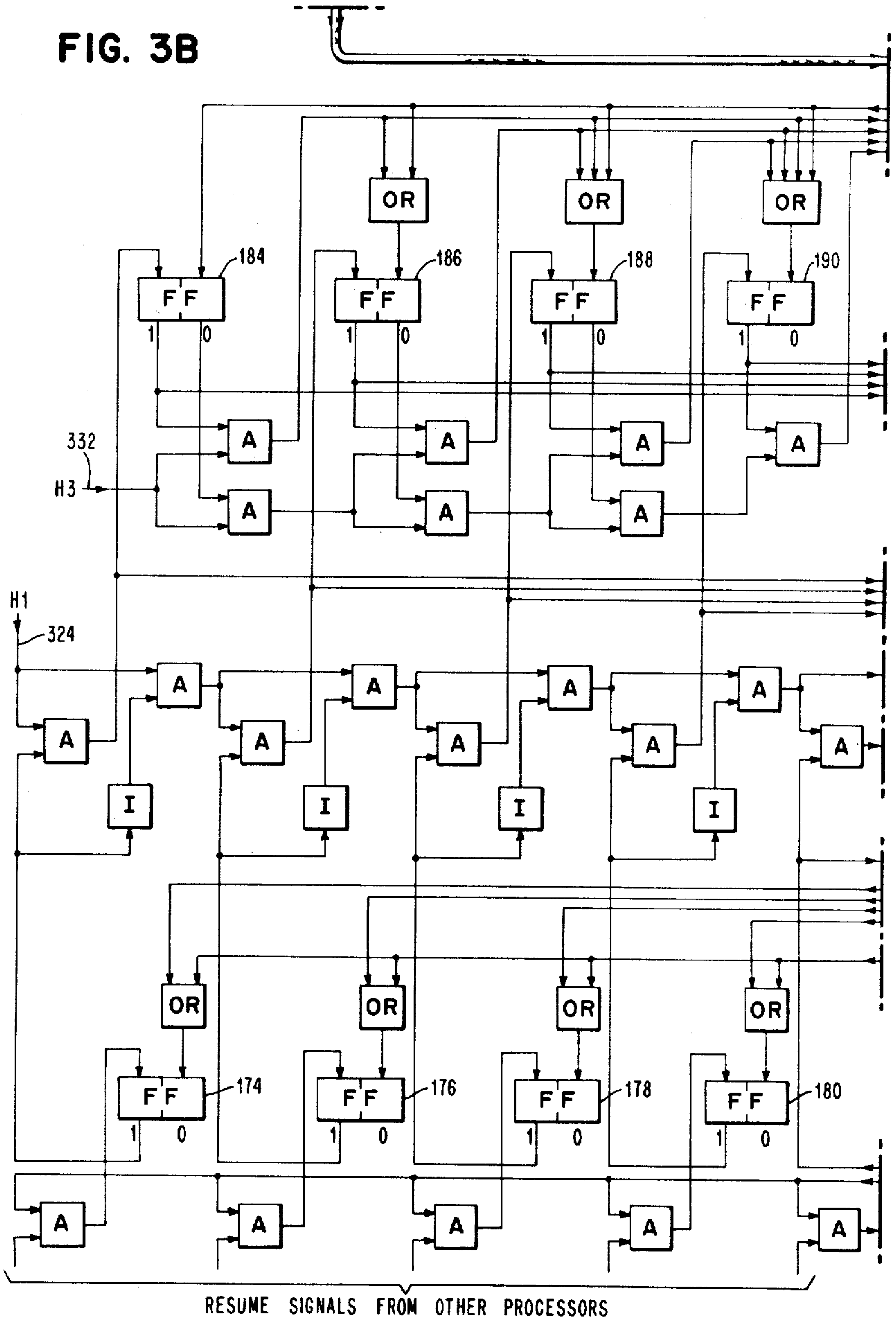
Figure 3C:
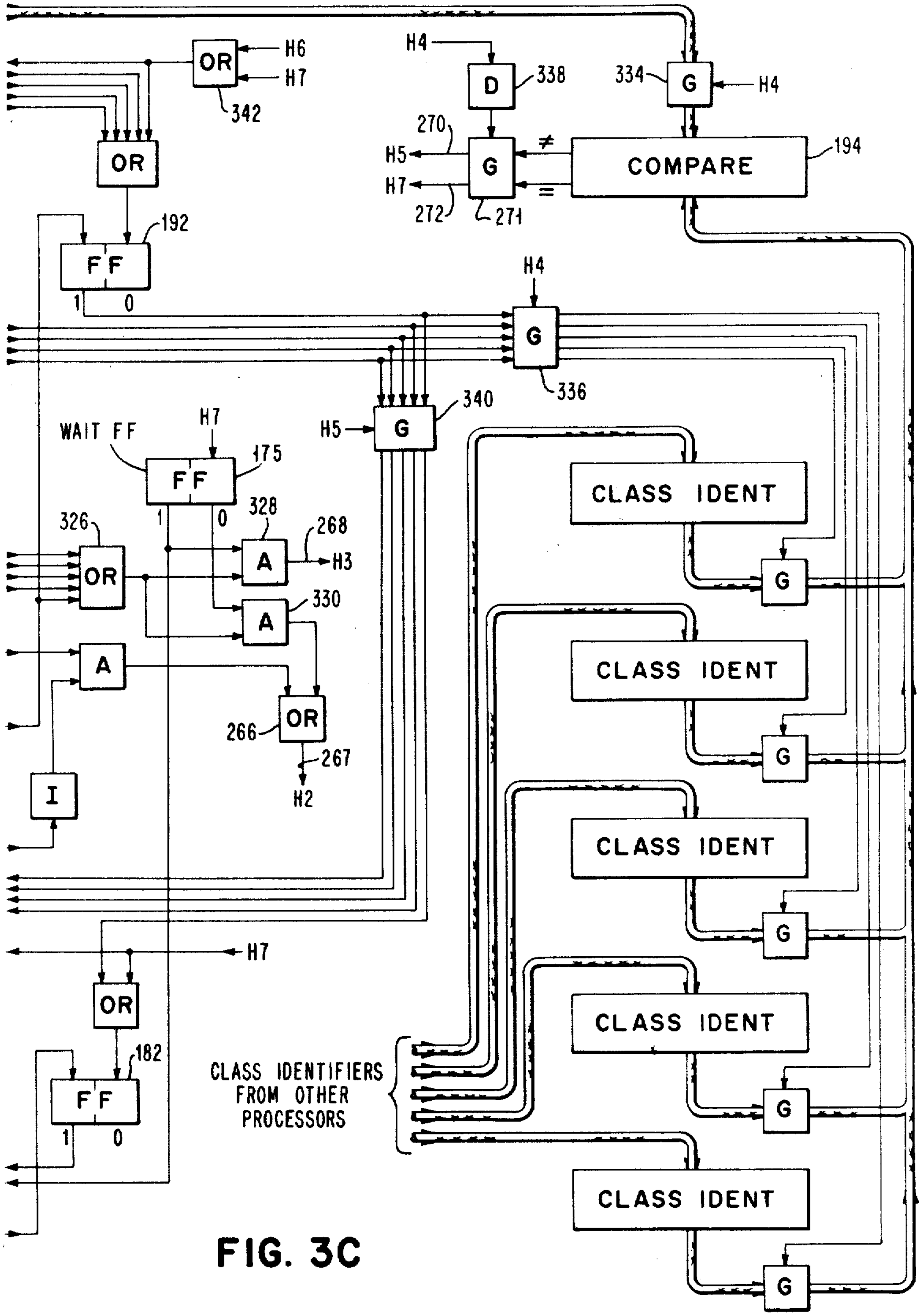

If a given processor is in the "wait" state at the time that the resume signals are broadcast, such signals will arrive as shown at the base of FIG. 3B and will be effective to set one of flip-flops 174–182 to its "1" state. In this connection, it is to be noted that the resume signals shown in FIG. 3B can only be effective provided that a wait flip-flop 175 is in its "1" state, the set output of flip-flop 175 being a necessary input to activate the AND circuits whose respective outputs are the set inputs to flip-flops 174 to 182. In FIG. 3C, there are shown a plurality of "class identifier" registers in a processor which are respectively loaded with the class identifier codes from other processors. It is thus seen that the G clock functions, as does the C clock, to control the carrying out of the RI instruction and also to effect the broadcasting of the "class identifier" to all processors.

Referring to FIG. 13, it is noted that the H clock is initially actuated by a start pulse (provided by means not shown) through an OR circuit 311 which activates a monostable multivibrator H1, pulse H1 being applied to a line 324 (FIG. 3B) in order to ascertain the "leftmost" one of flip-flops 174–182 that is in its "1" state. If one of these latter flip-flops is in its "1" state, a corresponding flip-flop in the group of flip-flops 184–192 is set to its "1" state. However, if none of flip-flops 174–182 are in their "1" states, the pulse applied to line 324 appear as an input to an OR circuit 266 (FIG. 3C), whereby the output of OR circuit 266 on line 267 triggers a monostable multivibrator H2. Pulse H2 is used for delay only and, upon its termination, it again actuates monostable multivibrator H1 through OR circuit 311. If, at this time, one of flip-flops 174–182 is in its "1" state, OR circuit 326 (FIG. 3C) has an output which is applied to an AND circuit 328. If, at this time, wait flip-flop 175 is in its "1" state, an output is produced from AND circuit 328 on a line 268 which functions to trigger a monostable multivibrator H3. However, if at this time flip-flop 175 is in its "0" state, then the output from OR circuit 326 causes the production of an output from an AND circuit 330 to enable OR circuit 266 and thereby reactuate monostable multivibrator H2 by the activation of line 267.

If it is assumed that monostable multivibrator H2 has been actuated due to the enabling of AND circuit 328, then pulse H3 is applied to a line 332 (FIG. 3B). Pulse H3 is operative to monitor flip-flops 184–192 to insure that only the "leftmost" one of these flip-flops is in the "1" state. It is possible that, because of the random setting to "1" of flip-flops 174–182, that pulse H1, applied to line 324, might split and cause more than one of flip-flops 184–192 to be set to the "1" state. Pulse H3 insures that only one of flip-flops 184–192 is set to the "1" state by finding the "leftmost" one thereof that is in its "1" state and resetting all of those flip-flops to the right of it to the "0" state.

Upon the termination of pulse H3, a monostable multivibrator H4 is activated, pulse H4 being applied to a gate 334 (FIG. 3S) in order to gate the address field of instruction register 156 to a compare unit 194. Pulse H4 is also applied to a gate 336 (FIG. 3C) in order to select one of the class identifiers and gate it to compare unit 194, the class identifier so selected depending upon which one of flip-flops 184–192 is in its "1" state. In addition, pulse H4 is applied to a gate 271 through a delay unit 338 in order to test the output of compare unit 194. If such output shows equality, then an output line 272 of a gate 271 is actuated to trigger a monstable multivibrator H7. However, if such output shows inequality, then an output line 270 of gate 271 is actuated to trigger monostable multivibrator H5.

Pulse H5 is applied to a gate 340 to reset the flip-flop of flip-flops 174–182 that had been the "leftmost" flip-flop thereof in its "1" state when pulse H1 had been previously applied. Upon the termination of pulse H5, a monostable multivibrator H6 is actuated, pulse H6 being applied to an OR circuit 342 to reset all of flip-flops 184–192 to their "0" states. Upon the termination of pulse H6, monostable multivibrator H1 is reactuated through OR circuit 311. With this arrangement, the H clock will be operative to keep selecting leftmost flip-flop of flip-flops 174–182 until it finds a class identifier that agrees with the class identifier specified in the address field of instruction register 156. If no such agreeing class identifier can be found, then the H clock merely reverts back to monostable multivibrator H1 and continues such operation until one or more of flip-flops 174–182 are again set to their "1" states.

If the output of compare unit 194 shows equality when tested by the delay pulse H4, then monostable multivibrator H7 of the H clock would be actuated, pulse H7 being employed to reset all of flip-flops 184–192 to their "0" states. Pulse H7 is also utilized to reset all of flip-flops 174–182 to their "0" states and to reset the "wait" flip-flop 175 to its "0" state.

Figure 3G:
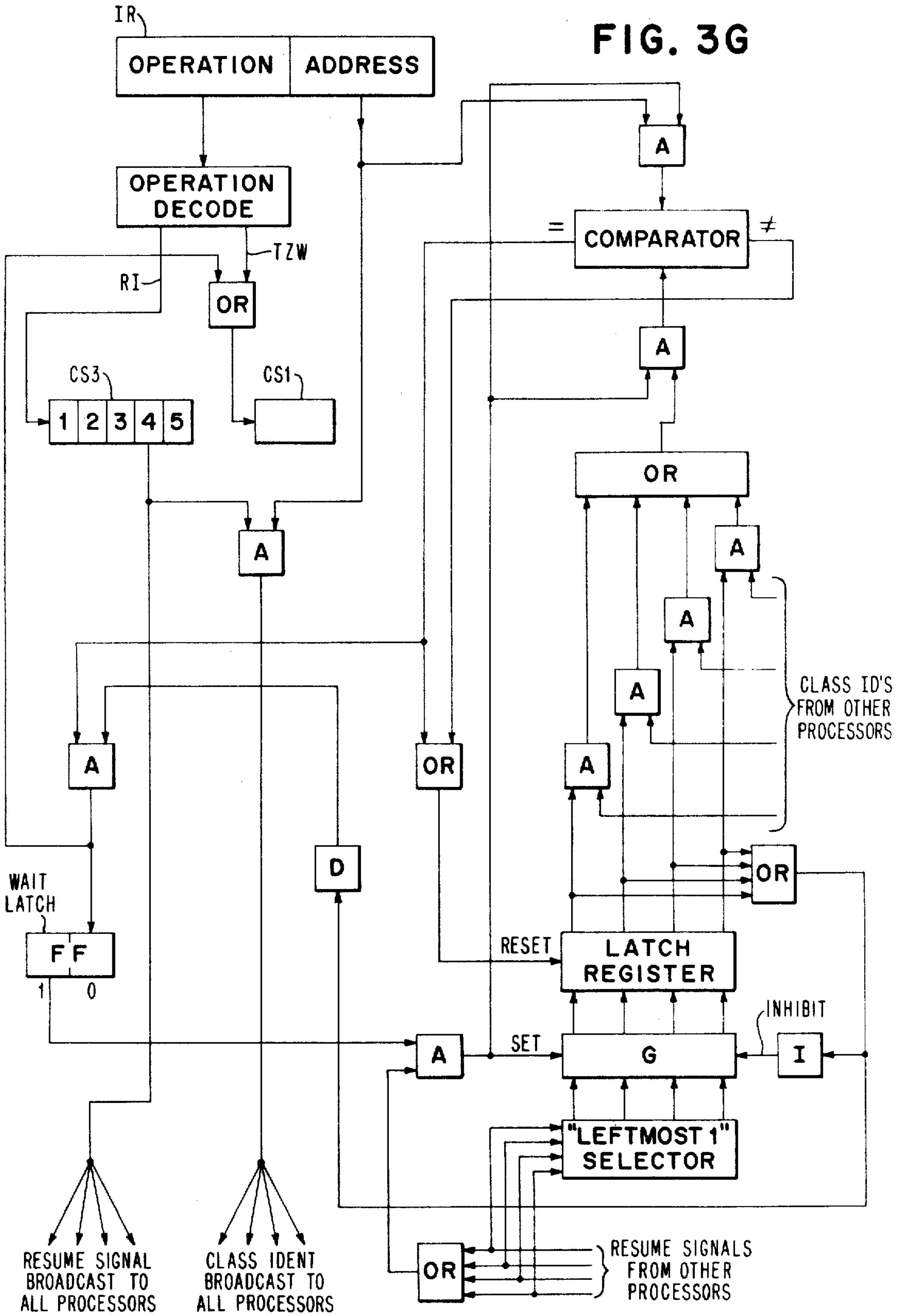
FIG. 3G is a depiction of a generalized embodiment of the invention and including the selected "resume" feature.
Figures 4, 4A:
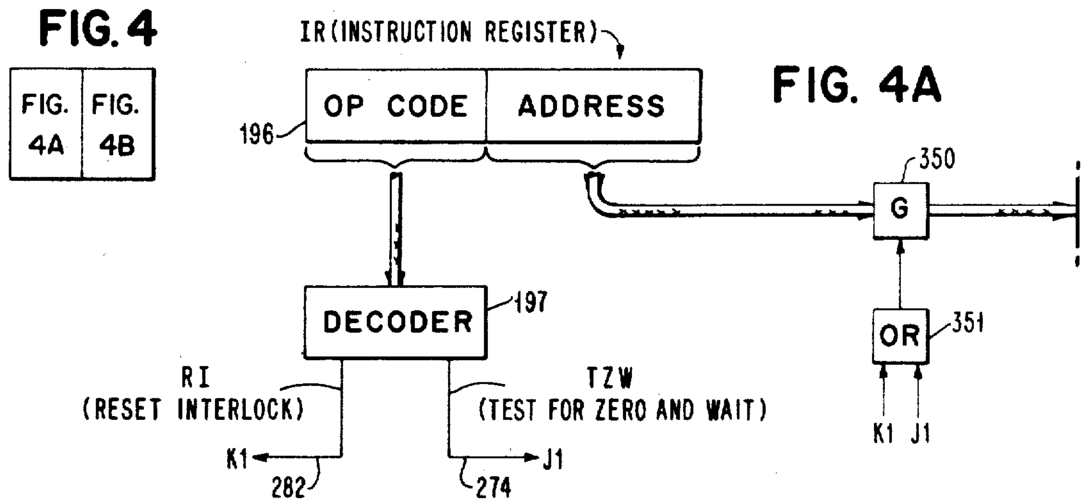
FIGS. 4A and 4B, taken together as in FIG. 4, depict a portion of a further embodiment, according to the invention, which includes a "single processor resume" feature.

In FIG. 3G, wherein there is shown a generalized embodiment according to the invention and including the "selective resume" feature, it is seen that on the fourth step of the CS3 sequence for the RI instruction, the address field of that instruction is gated out to be broadcast to all other processors, in parallel with the "resume" signal. A processor receiving one or several resume signals will select one of them, for example, the "leftmost," which is set into a latch register in which each position corresponds to a processor. As soon as one of the latches is set, further responses are inhibited. The single latch, having been set, selects the class identifier being presented by the corresponding processor which is gated to a comparator together with the class identifier that had previously been derived by the TZW instruction (the use of the instruction address as an identifier is shown here). If equality exists, the "wait" latch is reset and the latent TZW instruction is repeated, as in the basic embodiment. Whatever the result of the comparison, the latch register is reset, thereby conditioning the processor to subsequent "resume" signals.

In considering embodiments shown in FIGS. 3, 3A–3G, it is appreciated that the number of accesses to storage by processors restarted by the selective resume operation of this embodiment may still be excessive. Accordingly, in the embodiment shown in FIGS. 4, 4A, 4B and FIGS. 5, 5A–5E, there is illustrated means for causing only one of those processors waiting for an interlock to be unlocked to resume processing once such interlock is unlocked. Essentially, in this embodiment, a record is maintained of all processors idling during a particular locked interlock. The processor executing the RI instruction automatically determines which of the processors waiting during the particular interlock should be reactivated and sends a resume signal to that processor alone.

In the present embodiment, this record is kept in the interlock location itself, which contains a flag bit whose value indicates whether the interlock is locked or not, as well as one additional bit for each processor in the system. If the interlock bit associated with a given processor is in the "1" state, this signifies that this processor is waiting for the interlock to unlock.

Reference is now made to FIGS. 4, 4A, 4B, FIGS. 5, 5A–5E, and FIGS. 14, 15 and 16, the latter three figures respectively depicting the J, K and L clocks which are utilized in the operation of the embodiment shown in FIGS. 4, 4A, 4B and FIGS. 5, 5A– 5E. The J, K and L clocks are similar in structure and operation to those of the A–H clocks shown in FIGS. 6–13 respectively.

When a decoder 197 decodes a TZW instruction, an output appears on an output line 274 thereof which is effective to trigger a monostable multivibrator J1. Pulse J1 is applied to a gate 350 through an OR circuit 351 in order to gate the address field of an instruction register (IR) 196 ti a memory address register (MAR) 198. Upon the termination of pulse J1, a monostable multivibrator J2 is actuated, pulse J2 being applied to a line 200 (FIG. 5D) in order to request a "read" memory access and to hold the memory for a subsequent store operation. At the same time, a flip-flop 204 is set to its "1" state. Upon the terminatiin of pulse J2, a monostable multivibrator J3 is triggered through an OR circuit 279, pulse J3 being applied to a gate 281 in order to test for the state of flip-flop 204. If at this point flip-flop 204 is in its "1" state, then a pulse appears on output line 276 of gate 281 and a monostable multivibrator J4 is actuated. However, if flip-flop 204 is in its "0" state at this time, then a pulse appears on output line 278 of gate 281 and monostable multivibrator J5 is actuated. Flip-flop 204 will be in its "0" state when the "read" access is complete and the information has been placed into the storage register. It is noted that the operation of monostable multivibrators J1–J4 is the same as that of monostable multivibrators A1–A4 of the A clock.

Figure 5C:
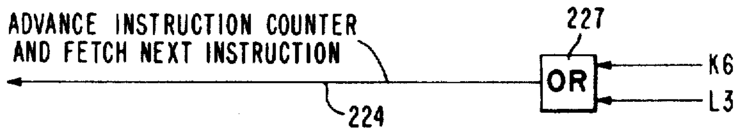
FIG. 5C shows an arrangement suitable for use in carrying out an instruction counter advance function in the operation of the embodiment shown in FIGS. 4, 4A, 4B and FIGS. 5, 5A and 5B.
Figure 5A:
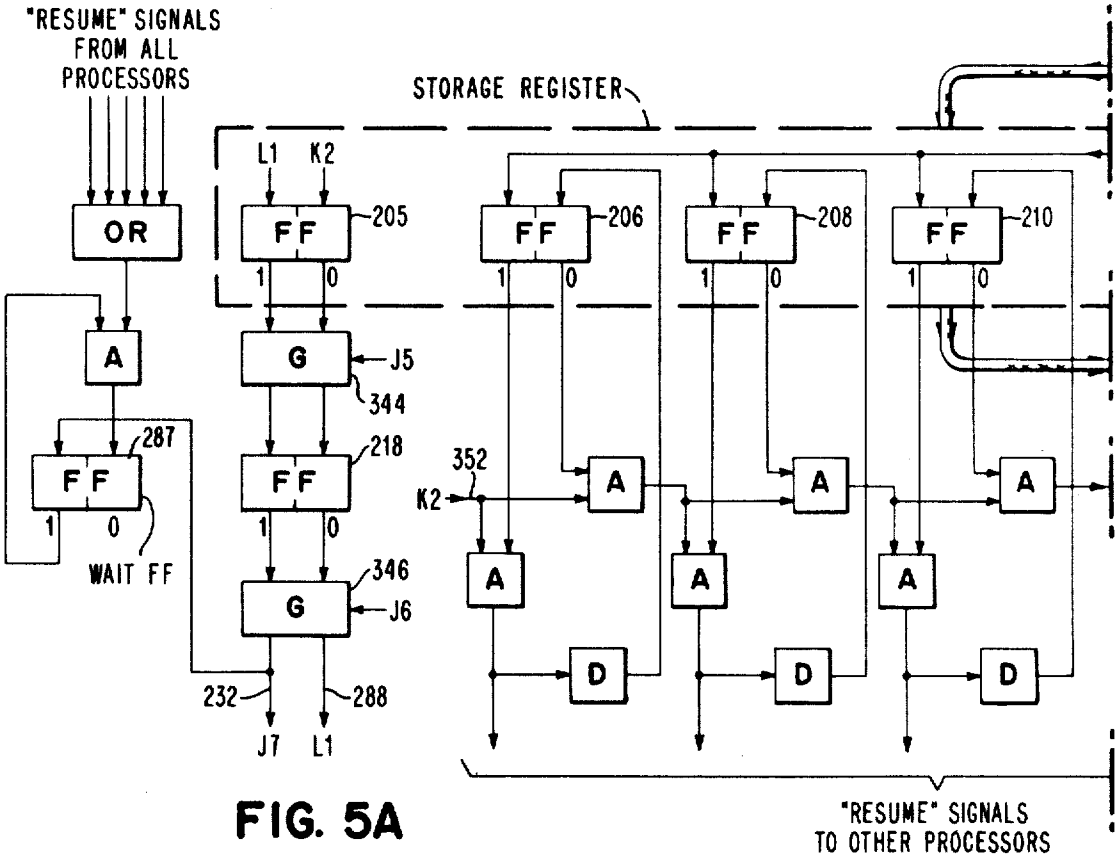
FIGS. 5A and 5B, taken together as in FIG. 5, depict another portion of this further embodiment.
Figure 4B:
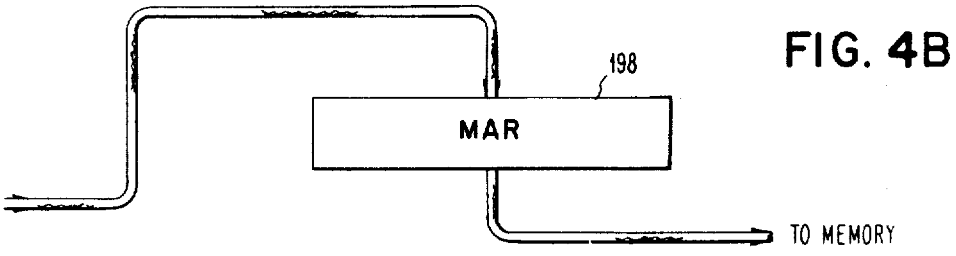
Figure 5D:
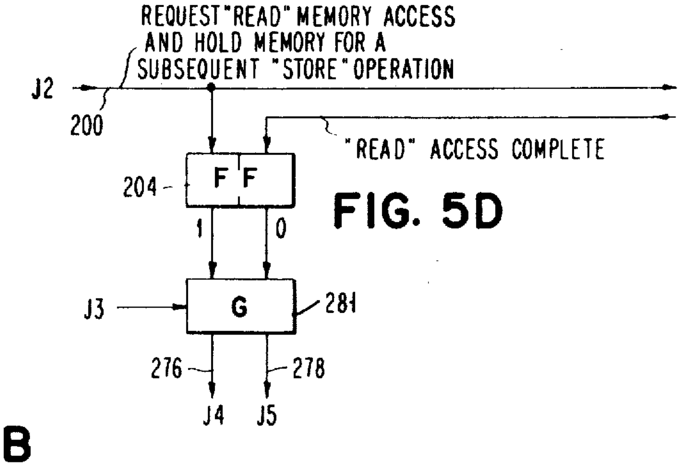
FIG. 5D shows an arrangement suitable for use in carrying out the "read" and "hold" memory access function in the embodiment shown in FIGS. 4, 4A and 4B and FIGS. 5, 5A and 5B.
Figure 5:
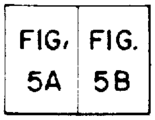
FIG. 5E shows an arrangement suitable for use in carrying out the "store" request function in the embodiment shown in FIGS. 4, 4A and 4B and FIGS. 5, 5A and 5B.
FIG. 5F is a depiction of a generalized embodiment of the invention and including the "single processor resume" feature.
Figures 5B, 5E:
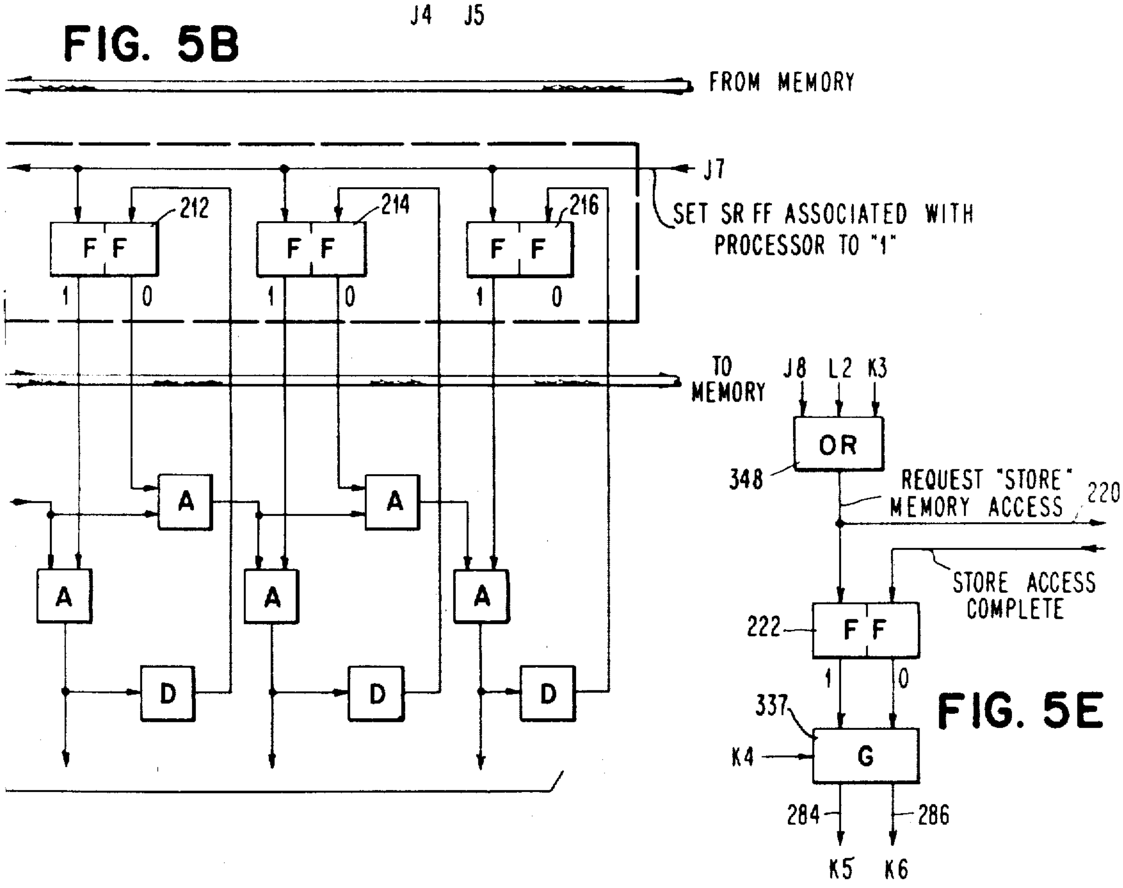

It is noted in FIGS. 5A and 5B that the storage register consists of flip-flops 205–216. The leftmost flip-flop 205 is used as a flag bit to indicate that the interlock is either locked or unlocked. The remaining flip-flops designated with the numerals 206–216 are in one-to-one correspondence with the processors comprised in the system. In the example of a system depicted, there are six processors; each of the processors thus is assigned one of the flip-flops 206–216. The remainder of the J clock serves to ensure if a given one of these six processors is put into the "wait" state by the interlock location currently being examined, that the flip-flop associated with this processor is set to its "1" state, before the interlock word is stored back into memory. Thus, the location containing the interlock information in the form of a flag indicating whether or not the interlock is on or off, will also contain one bit for each one of the processors in the system indicating whether or not this processor is currently in the "wait" state due to the particular interlock envisaged.

This operation is achieved in the following manner.

If flip-flop 204 is in its "0" state, a pulse appears on output line 278 of gate 281 and a monostable multivibrator J5 is actuated. Pulse J5 is applied to a gate 344 (FIG. 5A) in order to transfer the contents of flip-flop 205 to a flip-flop 218. Upon the termination of pulse J5, a monostable multivibrator J6 is actuated. Pulse J6 is applied to a gate 346 (FIG. 5A) in order to test for the state of flip-flop 218. If flip-flop 218 is in its "1" state, the "wait" flip-flop 287 is set to its "1" state and the pulse appearing on the output line 232 of gate 346 is operative to actuate a monostable multivibrator J7. The effect of pulse J7 is different in each of the processors in the system, in that it is employed to set to the "1" state the particular storage register flip-flop that corresponds to the associated processor. When pulse J7 terminates, a monostable multivibrator J8 is actuated and pulse J8 is applied to an OR circuit 348 (FIG. 5E) to actuate line 220 and thereby request a "store" memory access.

If output line 288 of gate 346 is activated as a result of the application of pulse J6 to gate 346, while flip-flop 218 is in its "0" state, the operation of the L clock (FIG. 16) is initiated. Pulse L1 is utilized to set the flag bit flip-flop 205 in the storage register to its "1" state. Upon the termination of pulse L1, a monostable multivibrator L2 is actuated whereby pulse L2 is applied to OR circuit 348 in order to request a "store" memory access. Upon the termination of pulse L2, a monostable multivibrator L3 is actuated and pulse L3 is applied to a line 224 through an OR circuit 227 (FIG. 5C) in order to provide a signal to advance the instruction counter and fetch the next instruction.

The microprogram employed in the execution of the reset interlock (RI) instruction is controlled by the K clock shown in FIG. 15. The initiation of operation of the K clock is effected by the appearance of the RI instruction whereby the output line 282 of decoder 197 is activated to trigger a monostable multivibrator K1. Pulse K1 is applied to gate 350 through OR circuit 351 in order to gate the address of the RI instruction from the address field of instruction register (IR) 196 to memory address register (MAR) 198. Upon the termination of pulse K1, a monostable multivibrator K2 is actuated, pulse K2 being employed to set flip-flop 205 (FIG. 5A) to its "0" state. Pulse K2 is also conveyed by a line 352 to a circuit which finds the leftmost flip-flop of flip-flops 206–216 in the storage register which is in the "1" state, sending the resume signal to the processor identified by this leftmost flip-flop; the processor thereby identified is selected as the next processor to enter into the program section that was released by the execution of the RI instruction. In addition, this resume signal is employed in the processor transmitting it, in a manner so as to reset to the "0" state the particular flip-flop in the storage register 206–216 corresponding to the processor to which the resume signal is sent; the other flip-flops in this register are not affected thereby.

Upon the termination of pulse K2, a monostable multivibrator K3 is actuated, pulse K3 being applied to OR circuit 348 (FIG. 5E) in order to activate line 220 and thereby request a "store" memory access. Pulse K3 also at this time sets flip-flop 222 to its "1" state. Upon the termination of pulse K3, a monostable multivibrator K4 is actuated through an OR circuit 295 (FIG. 15), pulse K4 being employed to test the state of flip-flop 222 by being applied to a gate 337. If flip-flop 222, at this time, is in its "1" state, then output line 284 becomes active to trigger a monostable multivibrator K5. However, if flip-flop 222 is in its "0" state, then output line 286 of gate 337 becomes active and a monostable multivibrator K6 is triggered. Pulse K5 is employed for delay only and, upon the termination thereof, monostable multivibrator K4 is again actuated through OR circuit 295. Pulse K6 is applied to line 224 (FIG. 5C) in order to provide a signal to advance the instruction counter and fetch the next instruction.

Figure 5F:
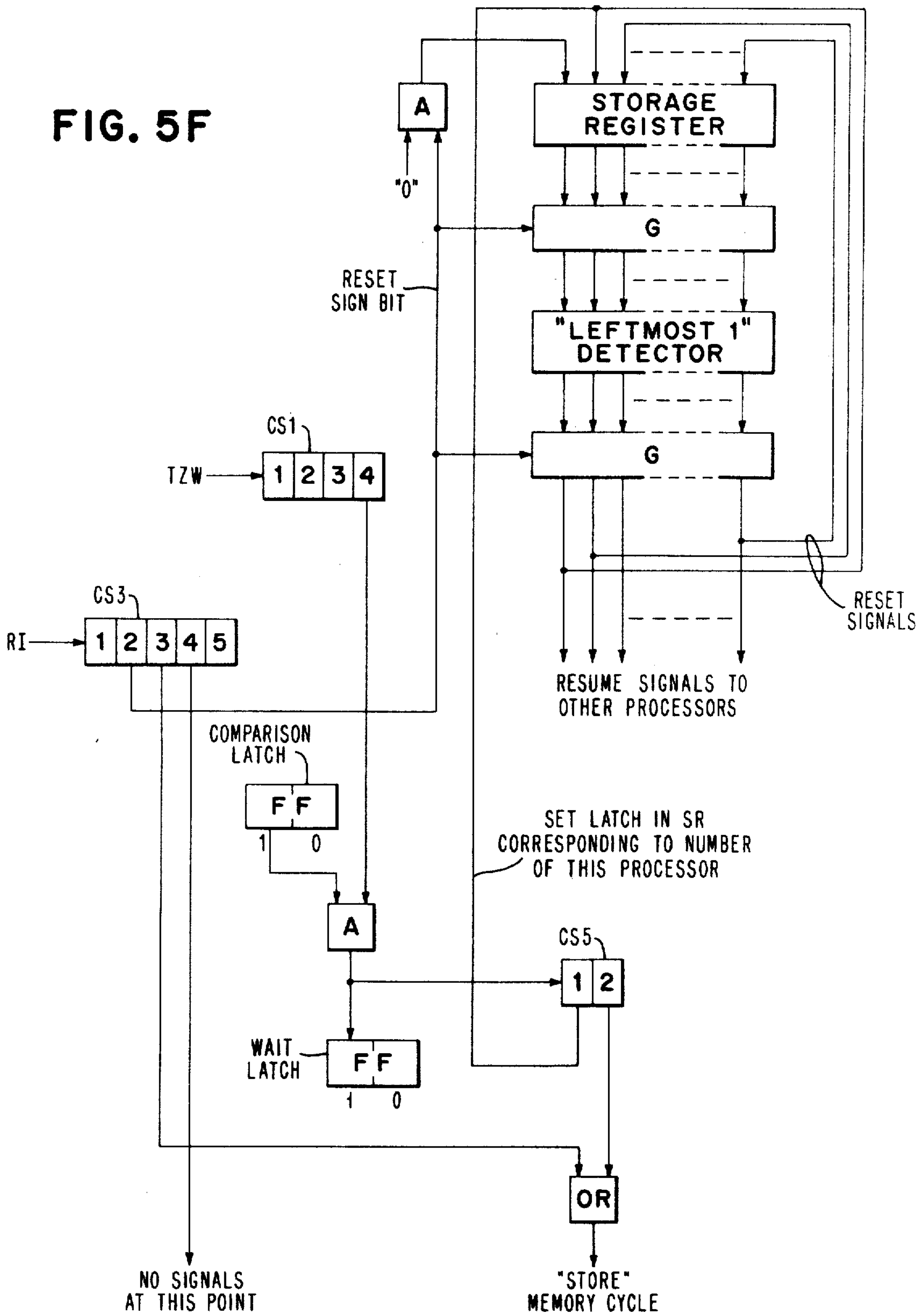

In FIG. 5F, wherein there is shown a depiction of a generalized embodiment according to the invention and including the "single processor resume" feature, it is seen that there is stored therein the information concerning which processors are waiting in the bits of the word at interlock location N, each processor corresponding to a unique bit. A particular processor, i.e., the "leftmost," is signalled to resume when the RI instruction is executed. Thus, at step 4 of the CS1 sequence, initiated by the TZW instruction, if the comparison latch indicates that the interlock is set, it causes the initiation of the sequence controlled by shift register CS5. The latter sequence consists of two steps, viz.:

(1) The setting to "1" of the latch in the storage register corresponding to the processor executing the instruction, the other latches being unchanged.

(2) The returning of the storage register's contents to memory. This step marks the processor as waiting in the interlock word.

During the RI instruction of a processor, the following modifications are made in the basic mechanism of the steps of the sequence controlled by shift register CS3.

(3) Instead of zeroing the entire contents of the storage register, the sign bit is set to zero. In addition, the leftmost one bit of the remainder of the storage register is detected. A resume signal is sent to the processor containing that bit, if any processor is waiting due to the current interlock. Also, such bit is set to "0" in the storage register.

(4) No signal is necessary at this point.

The resume arrangement shown in the embodiment in FIGS. 4, 4A, 4B, 5, 5A–5E will cause the signalled processor, and only that one, to resume processing with its TZW instruction.

It is to be understood that the selection of a particular processor to resume can be performed other than by detection of the leading "1" of the interlock word. A code or an address in the interlock word indicating a particular mechanism could be invoked in place of the leading "1" detector to select a particular processor to resume.

In the embodiments shown above, constructed in accordance with the principles of the invention, the following is the case.

(A) The action of the TZW instruction is to set an interlock.

(B) The action of the RI instruction is to clear the lock set by the TZW instruction.

(C) It is assumed that for any particular "locked program," all users execute the lock/unlock sequence in the proper order, since the interlock is basically for their own protection.

The execution of an RI instruction on an interlock word by a processor other than the one which executed the TZW instruction still in force may cause spurious and deleterious results. A mechanism for preventing such results, would be to associate a "processor number" with the lock word which identifies the processor which has "locked out" the associated code, permitting only that identified processor to issue a resume signal. Such mechanism would require the insertion of a comparison on the RI instruction and a store of the processor number in the interlock word on the TZW instruction. An alternative mechanism could be one which enables the keeping of a record of registers of what set a processor has locked out by TZW instructions and which would only permit RI instructions on that set.

In the embodiment shown in FIGS. 2, 2A–2F, a task being denied access through the interlock is suspended and put on a task queue. This action frees the processor. A subsequent resume instruction for this suspended task is handled such that the task involved is again a candidate for selection by a processor, i.e., put in a ready state.

In considering the invention as described in the foregoing embodiments, it is understood that within the scope and spirit of the invention variations may be made therein. For example, instead of utilizing a location in main, i.e., shared, memory, the TZW and RI instructions could refer to a bank of latches provided for the TZW and RI instructions, such latches being accessible to all of the processors.

The interlock bit could be held within the TZW or RI instructions themselves rather than in a separately addressed memory location. Such arrangement would save a memory access but, of course, would preclude writing re-entrant programs. For interlock identification, a register or field other than an instruction register could be used. For example, for such interlock identification, a separate register could be provided in each processor for this purpose, such separate register being loaded by a special instruction or from a field in the TZW and RI instructions. Alternatively, with regard to interlock identification, there could be provided a general register, addressed in both TZW and RI instructions which would be loaded prior to these instructions.

The following tabulation sets forth the relationship of the operations under the control of the A clock shown in FIG. 6.

| Step No. | Conditions for activation | Functions | Successor step |
|---|---|---|---|
| A1 | The decoding of the TZW instruction. | Gates the address field of instruction register (IR) 100 (Fig. 1A) to the memory address register (MAR) 102. | A2. |
| A2 | The end of A1 | Requests a "read" memory access holding the memory for a subsequent "store" operation. | A3. |
| A3 | The end of A2. The end of A4. | Ascertains whether the "read" access 1 complete | A4, if "read" access is incomplete, otherwise A5. |
| A4 | "Read" access incomplete | Used for delay only | A3. |
| A5 | "Read" access complete | Compares the contents of the storage register 110 with all "0's." If equal, the comparison latch 114 (Fig. 1B) is reset to its "0" state. If unequal, it is set to its "1" state. | A6. |
| A6 | The end of A5 | Tests the state of comparison latch 114 (Fig. 1B). If 114 indicated non-zero in the storage register, the "wait" flip-flop 207 (Fig. 1A) is set. | A7, if flip-flop indicates non-zero in storage register, otherwise B1 (Fig. 7). |
| A7 | The end of A6 | Requests a "store" memory access | |

The following tabulation sets forth the relationship of the operations under the control of the B clock shown in FIG. 7.

| Step No. | Conditions for activation | Functions | Successor step |
|---|---|---|---|
| B1 | The activation of line 234 (Fig. 1B) when flip-flop 114 (comparison latch) is in its "0" state. The end of A6. | Gates the contents of the "one's" register 118 to storage register 110 (Fig. 1B) | B2. |
| B2 | The end of B1 | Requests a "store" memory accept (Fig. 1D) | B3. |
| B3 | The end of B2 | Advances the instruction counter (Fig. 1E) | |

The following tabulation sets forth the relationship of the operations under the control of the C clock shown in FIG. 8.

| Step No. | Conditions for activation | Functions | Successor step |
|---|---|---|---|
| C1 | When an RI instruction appears (Fig. 1A). | Gates the address field in instruction register (IR) 100 (Fig. 1A) to the memory address register (MAR) 102 (Fig. 1B). | C2. |
| C2 | The end of C1 | Gates "0's" from "zero's" register 112 to storage register 110 (Fig. 1B) | C3. |
| C3 | The end of C2 | Requests a "store" memory access (Fig. 1D) | C4. |
| C4 | The end of C3. The end of C5. | Tests for the state of flip-flop 122 to ascertain whether the "store" access is complete (Fig. 1D). | If flip-flop 122 is in its "1" state, C5. If flip-flop 122 is in its "0" state, C6. |
| C5 | The activation of output line 237 of gate 306. | Delay only | C4. |
| C6 | The activation of output line 238 of gate 306. | Broadcast a "resume" signal to all processors (Fig. 1F) | C7. |
| C7 | The end of C6 | Advances the instruction counter (Fig. 1E) | |

The following tabulation sets forth the relationship of the operations under the control of the D clock shown in FIG. 10.

| Step No. | Conditions for activation | Functions | Successor step |
|---|---|---|---|
| D1 | The appearance of the TZW instruction. | Gates the address field of instruction register (IR) 126 (Fig. 2A) to the memory address register (MAR) 128 (Fig. 2B). | D2. |
| D2 | The end of D1 | Requests a "read,, memory access and hold memory for a subsequent store operation (Fig. 2E). | D3. |
| D3 | The end of D2. The end of D4. | Ascertains whether the "read" access is complete | D4, if flip-flop 132 is in its "1" state. D5, if flip-flop 132 is in its "0" state. (Fig. 2E). |
| D4 | The activating of output line 242 of gate 295 (Fig. 2E). | Delay only | D2. |
| D5 | The activating of output line 244 of gate 295 (Fig. 2E). | Compares the contents of storage register 136 with all "0's". If equal, it sets flip-flop 140 (comparison latch) to its "1" state. If unequal, it sets flip-flop 140 to its "0" state (Fig. 2B). | D6. |
| D6 | The end of D5 | Tests the state of flip-flop 140. If flip-flop 140 is in its "1" state, the "wait" flip-flop is set to its "1" state and a "store" memory access is requested. | D7, if flip-flop 140 is in its "1" state, B1, if flip-flop 140 is in its "0" state. |
| D7 | The end of D6 | If processor is waiting, it gates the "interval" field of instruction register (IR) 126 to interval timer 316. | D8. |
| D8 | The end of D7 | If processor is waiting, ("wait" flip-flop is in its "1" state), sets flip-flop 148 (timer advance latch) to 1. | |

The following tabulation sets forth the relationship of the operations under the control of the E clock shown in FIG. 10. It is to be noted that the E clock continually cycles.

| Step No. | Conditions for activation | Functions | Successor step |
|---|---|---|---|
| E1 | A start pulse. The end of E3. | Tests the state of flip-flop 148 (timer advance latch). If flip-flop 148 is in its "1" state,, output line 248 of gate 318 is activated to set E2. If flip-flop 148 is in its "0" state, output line 250 of gate 318 is activated to set E3 (Fig. 2A). | |
| E2 | The activating of output line 248 of gate 318 (Fig. 2A). | Decrements interval timer 316 (Fig. 2A) | E3. |
| E3 | The activating of output line 250 of gate 318 (Fig. 2A). The end of E2. | Delay only | E1. |

The following tabulation sets forth the relationship of the operations under the control of the F clock shown in FIG. 11. It is to be noted that the F clock cycles continuously.

| Step No. | Conditions for activation | Functions | Successor step |
|---|---|---|---|
| F1 | Start pulse. The end of F2. The end of F7 (Fig. 11). | Tests the state of the "wait" flip-flop and the interval timer (Fig. 2A). If the "wait" flip-flop is in its "1" state and the interval timer does not contain all "0's", output line 252 of gate 301 is activated to set F2 through OR circuit 261 (Fig. 11.) If the "wait" flip-flop is in its "0" state, output line 254 of AND circuit 259 is activated to set F2 through OR circuit 261. If interval timer 316 contains all "0's", output line 256 of gate 301 is activated to set F3. | |
| F2 | The activating of line 252. The activating of line 254. | Delay only | F1. |
| F3 | The activating of line 256 | Resets flip-flop 148 (timer advance latch) to the "0" state. Resets the "wait" flip-flop to the "0" state. | |
| F4 | The end of F3 | Effects the initiating of the interrupt program which puts a waiting task on the queue and picks up a ready task from the task queue. | F5. |
| F5 | The end of F4 | Tests for the state of flip-flop 152. If flip-flop 152 is in its "1" state, output line 258 of gate 322 is activated to set F6. If flip-flop 152 is in its "0" state, output line 260 is activated to set F7. | |
| F6 | The activating of line 258 | Delay only | F1. |
| F7 | The activating of line 260 | Applies a pulse to line 154 (FIG. 2D) to effect the fetching of the first instruction of the new task. | |

The following tabulation sets forth the relationship of the operations under the control of the G clock shown in FIG. 12.

| Step No. | Conditions for activation | Functions | Successor step |
|---|---|---|---|
| G1 | The activating of output line 262 from decoder 157 upon the appearance of the RI instruction. | Gates the address field of instruction register (IR) 156 to memory address register (MAR) 158 (Fig. 3A). | G2. |
| G2 | The end of G1 | Gates "0's" to storage register 162 (Fig. 3A) | G3. |
| G3 | The end of G2 | Requests a "store" memory access | G4. |
| G4 | The end of G3. The end of G5. | Tests for the state of flip-flop 166 to ascertain whether the store "access" is complete. If flip-flop 166 in is its "1" state, output line 263 of gate 309 is activated. If flip-flop 166 is in its "0" state, output line 264 of gate 309 is activated. | |
| G5 | The activating of line 263 (Fig. 3D). | Delay only | G4. |
| G6 | The activating of line 264 | Employs the "resume" signal which is broadcast to all of the processors (Fig. 3E). Broadcasts the address field of instruction register 156 (Fig. 3A). | G7. |
| G7 | The end of G6 | Used to advance the instruction counter (Fig. 3F). | |

The following tabulation sets forth the relationship of the operations under the control of the H clock shown in FIG. 13. It is to be noted that this clock cycles continuously.

| Step No. | Conditions for activation | Functions | Successor step |
|---|---|---|---|
| H1 | A start pulse. The end of H2. The end of H6. The end of H7 (Fig. 13). | Tests for the states of flip-flops 174-182. If any of flip-flops 174-182 are in the "1" state, the leftmost one of the latter is found and the corresponding flip-flop 182-192 is set to its "1" state (Figs. 3B, 3C). If none of flip-flops 174-182 are in the "1" state, output line 267 of OR circuit 266 is activated to set H2 (Fig. 13). If any of flip-flops 174-182 are in the "1" state and flip-flop 175 ("wait") is in the "0" state, line 267 is activated to set H2 (Fig. 3C). If any of flip-flops 174-182 are in the "1" state and flip-flop 175 ("wait") is in the "1" state, output line 268 of AND circuit 328 is activated to set H3 (Fig. 3C). | |
| H2 | The activating of line 267 | Delay only | H1. |
| H3 | The activating of line 268 | Checks the states of flip-flops 184-192 to insure that only one of these flip-flops is in the "1" state (Fig. 3B). | H4. |
| H4 | The end of H3 | Gates the address field of instruction register (IR) 156 to compare unit 194. Gates the selected class identifier. Tests the output of compare unit 194. If the output of compare unit shows equality, output line 272 of gate 271 is activated to set H7. If the output of compare unit shows inequality, output of compare unit shows inequality, output line 270 of gate 271 is activated to set H5 (Fig. 3C). | |
| H5 | The activating of line 270 | Resets the selected one of flip-flops 174-182 to its "0" state | H6. |
| H6 | The end of H5 | Resets all of flip-flops 184-192 to their "0" states | H1. |
| H7 | The activating of line 272 | Resets all of flip-flops 184-192 to their "0" states. Resets all of flip-flops 174-182 to their "0" states. Resets flip-flop 175 ("wait") to its "0" state. | H1. |

| Step No. | Conditions for activation | Functions | Successor step |
|---|---|---|---|
| J1 | The appearance of the TZW instruction to activate output line 274 of decoder 197. | Gates the address field of instruction register (IR) 196 to memory address register (MAR) 198. | J2. |
| J2 | The end of J1 | Requests "read" memory access and hold memory for a subsequent "store" operation. | J3. |
| J3 | The end of J2. The end of J4 | Tests flip-flop 202 to ascertain whether the "read" access is complete. If flip-flop 204 is in its "1" state, output line 276 of gate 281 is activated to set J4. If flip-flop 204 is in its "0" state, output line 278 of gate 281 is activated to set J5 (Fig. 14). | |
| J4 | The activating of line 276 | Delay only | J3. |
| J5 | The activating of line 278 | Tests flip-flop 204 of the storage register and places flip-flop 218 into the state that it finds for flip-flop 204. | J6. |
| J6 | The end of J5 | Tests the state of flip-flop 218 (Fig. 5A). If flip-flop 218 is in its "1" state, then flip-flop 287 ("wait") is set to its "1" state and output line 280 of gate 346 is activated to set J7. If flip-flop 218 is in its "0" state, output line 288 of gate 346 is activated to set L1 (Fig. 16). | |
| J7 | The activating of line 280 | Sets the one of flip-flops 206-216 which is associated with the processor to the "1" state (Figs. 5A & 5B). | J8. |
| J8 | The end of J7 | Requests a store memory access | |

The following tabulation sets forth the relationship of the operations under the control of the K clock shown in FIG. 15.

| Step No. | Conditions for activation | Functions | Successor step |
|---|---|---|---|
| K1 | The activating of output line 282 of decoder 197 when the RI instruction appears (Fig. 4A). | Gates the address field of instruction register (IR) 196 to memory address register (MAR) 198. | K2. |
| K2 | The end of K1 | Sets flip-flop 204 to the "0" state. Selects the leftmost one of flip-flops 206-216 that is in the "1" state and sends resume signal to processor. Through a delay, resets same leftmost one of flip-flop to t e "0" state (Figs. 5A and 5B). | K3. |
| K3 | The end of K2 | Requests "store" memory access | K4. |
| K4 | The end of K3 | Ascertains whether the "store" access is complete. | |
| | The end of K5 | If flip-flop 222 is in the "1" state, output line 284 of gate 337 is activated to set K5. If flip-flop 222 is in the "0" state, output line 286 of gate 337 is activated to set K6 (Fig. 5E). | |
| K5 | The activating of line 284 | Delay only | K1 |
| K6 | The activating of line 286 | Advances instruction counter | |

The following tabulation sets forth the relationship of the operations under the control of the L clock shown in FIG. 16.

| Step No. | Conditions for activation | Functions | Successor step |
|---|---|---|---|
| L1 | The activating of output line 288 of gate 346. | Sets flip-flop 204 to the "1" state (Fig. 5A) | L2. |
| L2 | The end of L1 | Requests a store memory access | L3. |
| L3 | The end of L2 | Advances the instruction counter | |

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system which includes a plurality of active first entities that may all use a second entity, an arrangement for preventing more than one of said first entities from concurrently respectively using said second entity and for selecting the next eligible first entity for using said second entity upon the termination of said second entity's use by the said first entity currently using it comprising:

storage means shared by said first entities and having a specified location in which each of said first entities is represented and which indicates whether one of said first entities is currently using said second entity, which of said first entities is using said second entity, and which of said first entities are waiting to use said second entity;

each of said first entities comprising:

means for receiving first and second instructions for respectively testing whether said second entity is being currently used by one of said first entities and for indicating that a first entity currently using said second entity has terminated its use, determining means responsive to the encountering of said first instruction for determining whether said second entity is currently being used by one of said first entities, means responsive to a determination that said second entity is currently in use for causing any other first entity attempting to use said second entity during such use to be placed in a wait state relative to said second entity and for causing the location in the storage means to indicate the use, means operative upon a determination of said determining means that said second entity is free for use for causing the storing in said storage means of the indication that said second entity is in use to thereby lock out all of said first entities other than the entity currently attempting to use said second entity, from using said second entity and for causing said location to indicate such use, and means responsive to the encountering by said first entity using said second entity of said second instruction for causing the removal of said use indication from said location in storage means and for effecting the selection of a chosen one of said first entities in the wait state as the next entity eligible to use said second entity.

2. In a data processing system as defined in claim 1 wherein said first and second instructions include address portions and said determining means comprises:

an instruction register for receiving said instructions;

a memory address register for receiving address portions of said instructions from said instruction register;

a storage register communicating with said location for holding the information indicated in said location; and means for testing whether said second entity is currently being used.

3. In a data processing system as defined in claim 2 wherein said storage register comprises a latch for representing whether said second entity is currently in use and a latch representing each of the active first entities in said system, one chosen state of a representing latch indicating whether the corresponding first entity is in the wait state.

4. In a data processing system as defined in claim 1 wherein said wait state causing means comprises latch means having one state which indicates that a first entity attempting to use a prescribed second entity is to wait and another state which indicates that said prescribed second entity is available for use.

5. In a data processing system as defined in claim 3 wherein said latches representing said first entities in said storage register are arranged conceptually in a given directional array, wherein said chosen one of said first entities is the one represented by a given terminal latch of said array in the wait state, and wherein means are further included in selecting said chosen entity for finding said terminal latch.

References Cited

UNITED STATES PATENTS

| | | |
|---|---|---|
| 3,398,405 | 8/1968 | Carlson et al. |
| 3,317,898 | 5/1967 | Hellerman. |
| 3,263,218 | 7/1966 | Anderson. |

GARETH D. SHAW, Primary Examiner